United States Patent
Dobesh et al.

(10) Patent No.: US 10,097,892 B2
(45) Date of Patent: Oct. 9, 2018

(54) METHOD AND SYSTEM FOR PRODUCTION AND CAPTURE OF CONTENT FOR LINEAR BROADCAST AND PUBLICATION

(71) Applicant: TURNER BROADCASTING SYSTEM, INC., Atlanta, GA (US)

(72) Inventors: Paul James Dobesh, Berkeley Lake, GA (US); Justin Raymond Williams, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 71 days.

(21) Appl. No.: 14/604,443

(22) Filed: Jan. 23, 2015

(65) Prior Publication Data

US 2016/0219335 A1 Jul. 28, 2016

(51) Int. Cl.
 *H04H 60/33* (2008.01)
 *H04N 5/445* (2011.01)
 *H04N 21/478* (2011.01)
 *H04N 21/4788* (2011.01)
 *H04N 21/4223* (2011.01)

(Continued)

(52) U.S. Cl.
 CPC .......... *H04N 21/478* (2013.01); *H04N 5/222* (2013.01); *H04N 7/144* (2013.01); *H04N 21/4223* (2013.01); *H04N 21/44218* (2013.01); *H04N 21/4788* (2013.01); *H04N 21/6405* (2013.01); *H04N 21/23424* (2013.01); *H04N 21/2665* (2013.01); *H04N 21/4622* (2013.01); *H04N 21/4753* (2013.01)

(58) Field of Classification Search
 CPC .......... H04N 7/14; H04N 7/142; H04N 7/144; H04N 5/222; H04N 21/4788; H04N 21/44218

USPC ........ 348/14.01, 14.03, 14.08; 725/106, 105, 725/9, 10, 12
See application file for complete search history.

(56) References Cited

U.S. PATENT DOCUMENTS

| | | | | |
|---|---|---|---|---|
| 4,467,349 A | * | 8/1984 | Maloomian | A47F 11/06 348/586 |
| 4,864,410 A | * | 9/1989 | Andrews | G03B 17/53 348/578 |

(Continued)

OTHER PUBLICATIONS

"Definition of Opaque", http://www.merriam-webster.com/dictionary/opaque, Jun. 26, 2016.*

*Primary Examiner* — James R Sheleheda
(74) *Attorney, Agent, or Firm* — Chip Law Group

(57) ABSTRACT

A content generation device (CGD), includes an opaque writing capture device (WCD), and an image capture device (ICD) and a mirror/antireflective pane with 45 degree beamsplitters. The ICD captures image content of a user performing drawing and/or writing on an opaque WCD, when the user is located external to the CGD and in front of the opaque WCD, and the capturing of the image content occurs from within the CGD and behind the opaque WCD. The opaque WCD concurrently captures user generated content corresponding to the drawing and/or writing. The CGD synchronously merges the image content and the user generated content to generate merged content and presents the merged content from within the CGD so that the presented merged content is viewable by the user through the opaque WCD. The CGD communicates the merged content to a multicast network operator for publication via one or more networks.

39 Claims, 10 Drawing Sheets

(51) Int. Cl.
  *H04N 21/6405*   (2011.01)
  *H04N 21/442*    (2011.01)
  *H04N 7/14*      (2006.01)
  *H04N 5/222*     (2006.01)
  *H04N 21/234*        (2011.01)
  *H04N 21/475*        (2011.01)
  *H04N 21/462*        (2011.01)
  *H04N 21/2665*       (2011.01)

(56) References Cited

U.S. PATENT DOCUMENTS

| | | | | |
|---|---|---|---|---|
| 4,928,301 | A * | 5/1990 | Smoot | H04N 7/144 348/14.16 |
| 5,025,314 | A * | 6/1991 | Tang | G06F 3/0425 178/18.11 |
| 5,400,069 | A * | 3/1995 | Braun | H04N 7/144 348/14.08 |
| 5,801,758 | A * | 9/1998 | Heirich | H04N 7/144 348/14.08 |
| 6,744,909 | B1 * | 6/2004 | Kostrzewski | G06E 3/001 356/71 |
| 7,333,135 | B2 * | 2/2008 | Foote | H04N 7/18 345/157 |
| 8,355,038 | B2 * | 1/2013 | Robinson | G06F 3/04883 348/14.01 |
| 8,488,042 | B2 * | 7/2013 | Robinson | H04N 5/222 348/333.1 |
| 9,325,943 | B2 * | 4/2016 | Wilson | H04N 7/157 |
| 2005/0253807 | A1 * | 11/2005 | Hohmann | G06F 3/043 345/156 |
| 2007/0040033 | A1 * | 2/2007 | Rosenberg | A47G 1/02 235/462.36 |
| 2008/0030300 | A1 * | 2/2008 | Naito | G06Q 30/02 340/5.1 |
| 2008/0150913 | A1 * | 6/2008 | Bell | G06F 3/011 345/175 |
| 2009/0021577 | A1 * | 1/2009 | Fredlund | H04N 9/3141 348/61 |
| 2009/0207383 | A1 * | 8/2009 | Hirahara | H04N 5/74 353/69 |
| 2010/0188474 | A1 * | 7/2010 | Robinson | G06F 3/04883 348/14.08 |
| 2010/0188548 | A1 * | 7/2010 | Robinson | H04N 5/222 348/333.01 |
| 2010/0238265 | A1 * | 9/2010 | White | H04N 7/144 348/14.16 |
| 2010/0238314 | A1 * | 9/2010 | Fredlund | H04N 9/3141 348/222.1 |
| 2010/0238341 | A1 * | 9/2010 | Manico | H04N 9/3141 348/333.01 |
| 2010/0277576 | A1 * | 11/2010 | Fattal | H04N 5/222 348/54 |
| 2011/0222784 | A1 * | 9/2011 | Rowe | G06F 3/04886 382/218 |
| 2011/0298935 | A1 * | 12/2011 | Segal | H04N 5/265 348/207.1 |
| 2013/0070344 | A1 * | 3/2013 | Takeda | G02B 6/0035 359/633 |
| 2013/0185679 | A1 * | 7/2013 | Fretwell | G06F 3/017 715/862 |
| 2013/0229482 | A1 * | 9/2013 | Vilcovsky | H04N 7/144 348/14.07 |
| 2013/0342493 | A1 * | 12/2013 | Crow | G06F 3/0425 345/174 |
| 2014/0009686 | A1 * | 1/2014 | Segal | H04N 5/2222 348/722 |
| 2014/0168243 | A1 * | 6/2014 | Huang | G06T 1/20 345/522 |
| 2014/0232816 | A1 * | 8/2014 | Wilson | H04N 7/157 348/14.08 |
| 2015/0262288 | A1 * | 9/2015 | Cypher | G06Q 30/0251 705/27.2 |
| 2016/0127710 | A1 * | 5/2016 | Saban | G02B 5/08 386/241 |

* cited by examiner

METHOD AND SYSTEM FOR PRODUCTION AND CAPTURE OF CONTENT FOR LINEAR BROADCAST AND PUBLICATION

CROSS-REFERENCE TO RELATED APPLICATIONS/INCORPORATION BY REFERENCE

Not Applicable.

FIELD

Certain embodiments of the invention relate to content generation and publication. More specifically, certain embodiments of the invention relate to a method, system, and non-transitory computer-readable medium for production and capture of content for linear broadcast and publication.

BACKGROUND

Multicast systems have traditionally distributed content through satellite, and cable networks. The proliferation of wireless technologies, and wireless communication devices, which provide anytime and anywhere communication, have fueled the distribution of content through social media networks into all facets of human life. Accordingly, social media networks provide an additional channel for distribution of content.

Limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A method, system, and non-transitory computer-readable medium for production and capture of content for linear broadcast and publication, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Figure 1A:
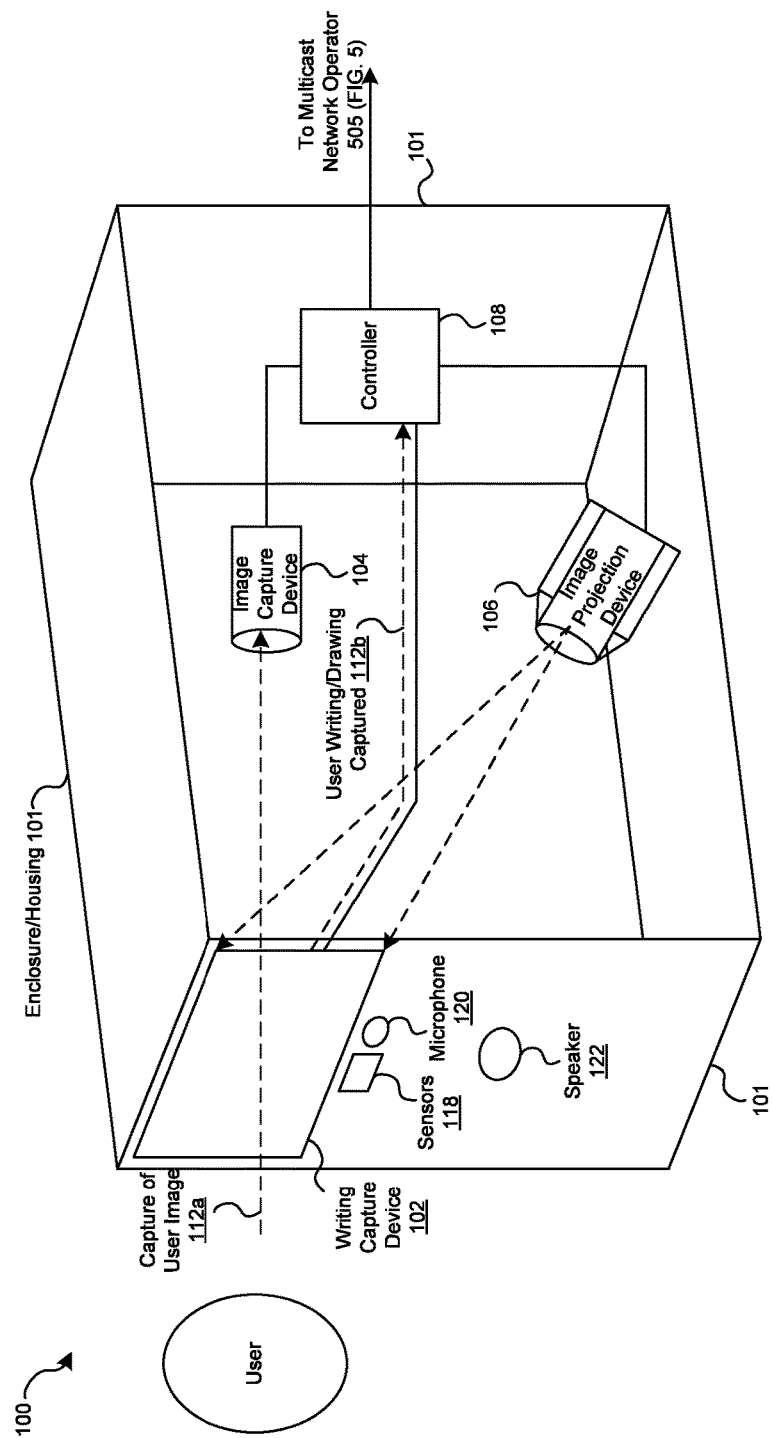
FIG. 1A is a block diagram of an exemplary system for linear broadcast and publication, in accordance with an exemplary embodiment of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain embodiments of the disclosure may be found in various methods, systems, and non-transitory computer-readable medium for production and capture of content for linear broadcast and publication. Exemplary aspects of the disclosure comprise a content generation device (CGD), which comprises an opaque writing capture device (WCD), and an image capture device (ICD). The ICD captures image content of a user performing drawing and/or writing on an opaque WCD, when the user is located external to the CGD and in front of the opaque WCD, and the capturing of the image content occurs from within the CGD and behind the opaque WCD. The opaque WCD concurrently captures user generated content corresponding to the drawing and/or writing. The CGD synchronously merges the image content and the user generated content to generate merged content and presents the merged content from within the CGD so that the presented merged content is viewable by the user through the opaque WCD. The CGD communicates the merged content to a multicast network operator for publication via one or more networks. The CGD may include a reflective pane that is mirror coated on one side, and has an antireflective coating on the other side, which comprises 45 degree beamsplitters.

FIG. 1A is a block diagram of an exemplary system for production and capture of content for linear broadcast and publication, in accordance with an exemplary embodiment of the disclosure. Referring to FIG. 1A, there is shown a device 100 that may be utilized for production and capture of content for linear broadcast and publication. The device 100 may comprise an enclosure or housing 101, a writing capture device (WCD) 102, an image capture device (ICD) 104, an image projection device (IPD) 106, and a controller 108. In some embodiments of the disclosure, the device 100 may comprise one or more sensors 118, one or more microphones 120, and one or more speakers 122. In FIG. 1A, a user is shown facing the enclosure or housing 101. The device 100 may be referred to as a content generation device. Reference 112a represents the image of the user being captured through the WCD 102 by the ICD 104. Reference 112b represents the drawing and/or writing generated by the user, which is captured by the WCD 102, being communicated to the controller 108.

The enclosure or housing 101 may comprise a structure for mounting the components comprising the WCD 102, the ICD 104, the IPD 106, the controller 108, the one or more sensors 118, the one or more microphones 120, and the one or more speakers 122. In some embodiments of the disclosure, the one or more sensors 118 may be mounted internal to and/or external to the enclosure or housing 101. Similarly, in some embodiments of the disclosure, the one or more microphones 120 may be mounted internal to and/or external to the enclosure or housing 101. The enclosure or housing 101 may comprise, for example, a main framed structure and one or more subframes on to which the components may be mounted. The outer surfaces, main framed structure and/or the one or more subframes may be fabricated from a rigid material, for example metal, composite material, wood, and/or moulded plastic. Exemplary metals may comprise, for example, aluminum, iron and any mixture thereof. Exemplary composite materials may comprise, for example, fiberglass. Exemplary metals composite material comprise, for example, fiberglass. The outer structure of the enclosure or housing 101 may comprise a sheeting material such as aluminum sheeting and/or stainless steel sheeting.

The WCD 102 may comprise suitable logic, circuitry, interfaces, and/or code that may be operable to capture writing, and/or drawings that are made on the surface of the WCD 102. In this regard, the WCD 102 may be operable to capture written, and/or drawn content and generate compressed or uncompressed data that may be communicated to the controller 108 for processing. The WCD 102 may be opaque so that the writing and/or drawing may be captured by the WCD 102, concurrently with the image of the user being captured by the ICD 104, and with a merged signal representative of the captured image of the user and written and/or drawn content being projected by the IPD 106 on the WCD 102. The user may write on the WCD 102 utilizing a finger, stylus, pen, or other similar type of writing implement. In some exemplary embodiments of the disclosure, the user may use gestures which may be translated into text and/or otherwise interpreted by the controller 108. The gestures may be utilized to interact with the device 100. The WCD 102 may comprise, for example, a touchfoil film, which may be sandwiched between a rear projection film and a protective glass. The touchfoil film is made by visualplanet.

The ICD 104 may comprise suitable logic, circuitry, interfaces, and/or code that may be operable to capture an image of the user through the opaque screen of the WCD 102. The ICD 104 may be positioned within the enclosure or housing 101 behind the WCD 102 so that the image of the user is captured through the opaque surface WCD 102 by the ICD 104. The ICD 104 may comprise, for example, a digital camera or a video camera, which may be operable to capture still and/or video images.

The image of the user that is captured by the ICD 104 may comprise still and/or moving images. The ICD 104 may be operable to generate compressed or uncompressed data representative of the captured image of the user to the controller 108 for processing. For example, the compressed or uncompressed data representative of the captured image of the user may be communicated to the controller 108 in a file. For a still captured image, the file may comprise, for example, a JPEG, GIF, PNG, and/or other format. For a moving captured image, the file may comprise, for example, a MPEG 2 or variants thereof (for example, AVC) file. In various embodiments of the disclosure, the ICD 104 may comprise a digital camera, or a video camera. In accordance with an embodiment of the disclosure, the capturing of the writing, and/or drawings that are made on the surface of the WCD 102 and the capturing of the image of the user through the opaque screen of the WCD 102 by the image captured by the ICD 104 may be done in a synchronous manner.

Figure 5:
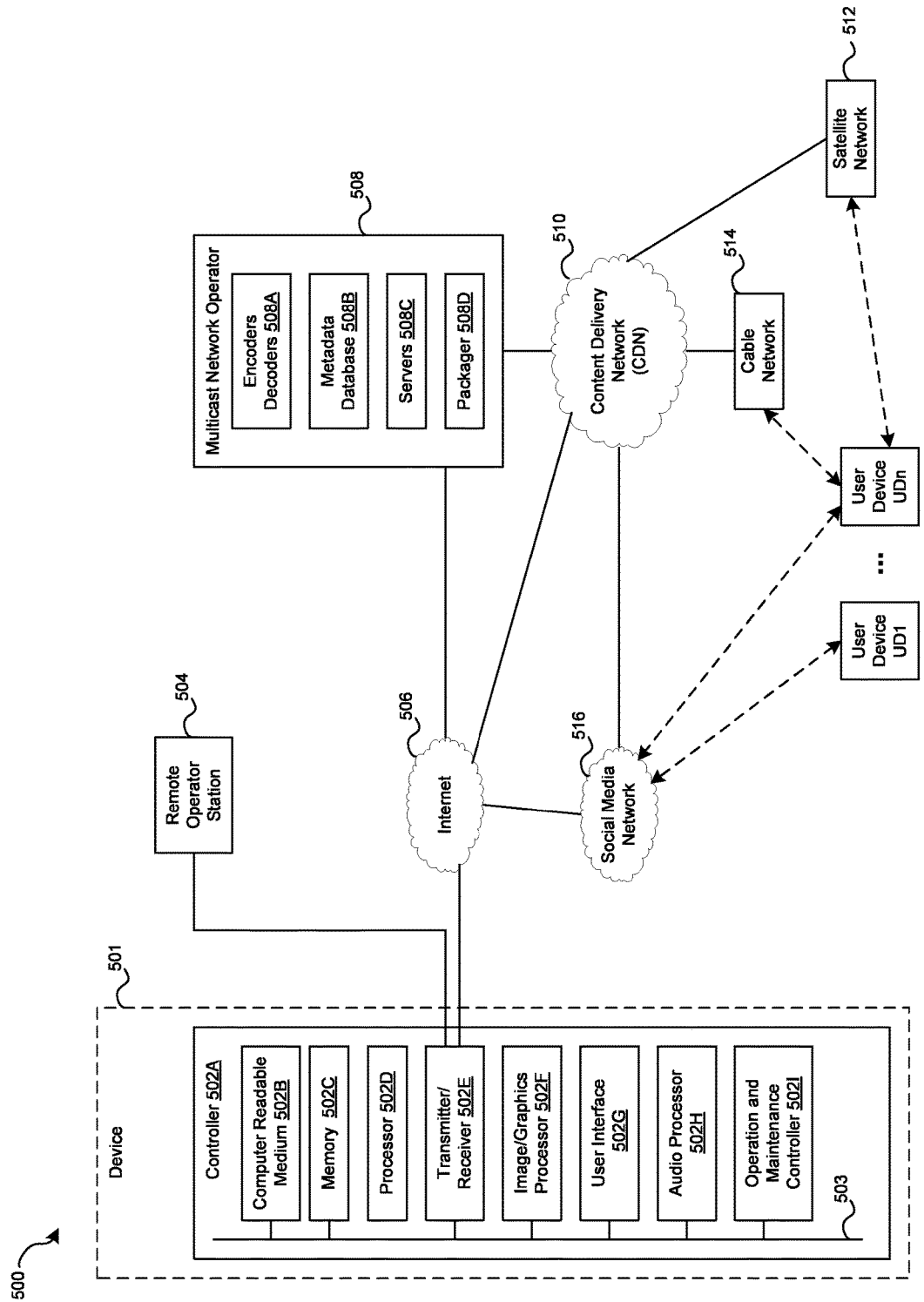
FIG. 5 is a block diagram illustrating a system for publishing captured content, in accordance with an exemplary embodiment of the disclosure.

The controller 108 may comprise suitable logic, circuitry, interfaces, and/or code that may be operable to control various operations of the device 100. The controller 108 may also be operable to communicate with a remote operations terminal 504 (FIG. 5) which may be utilized for operations, administration, maintenance, and provisioning of the device 100. The controller 108 may be operable to store, process, and/or merge the captured image of the user and the captured written and/or drawn content as needed for (1) handling by the IPD 106, and (2) for handling by a multicast network operator 508 (FIG. 5). In this regard, the controller 108 may be operable to store the captured written, and/or drawn content received from the controller 108, and also the data representative of the captured image of the user. For example, the controller 108 may be operable to store a digital representation of the captured written, and/or drawn content received from the WCD 102, and also the data representative of the captured image of the user, which is received from the ICD 104, in the memory 502C (FIG. 5). The controller 108 may utilize one or more CODECS, which may be utilized by the controller 108 to process the stored digital representation of the captured written, and/or drawn content, and the stored data representative of the captured image of the user. As part of the processing, the controller 108 may be operable to merge the stored digital representation of the captured written, and/or drawn content, and the stored data representative of the captured image of the user to generate a merged signal or merged content. The controller 108 may forward or otherwise communicate the merged signal representative of the captured image of the user and the written and/or drawn content to the IPD 106. The controller 108 may be operable to encapsulate a packetized version of the merged signal representative of the captured image of the user and the written and/or drawn content into one or more IP packets or datagrams. The one or more IP packets or datagrams may be communicated to the multicast network operator 508 (FIG. 5). The WCD 102, ICD 104, the IPD 106, the one or more sensors 118, the one or more microphones 120, the one or more speakers 122 may be coupled to and/or controlled by the controller 108.

The controller 108 may be operable to control and manage interaction of the user with the WCD 102. For example, the one or more sensors 118 may be utilized to detect the presence of the user when the user approaches and faces the WCD 102. The one or more microphones 120, in conjunction with the one or more sensors may be utilized by the controller 108 to detect the presence of the user when the user approaches and faces the WCD 102. In this regard, the one or more microphones 120 may be operable to detect sounds made by the user when the user approaches and faces the WCD 102. In some embodiments of the disclosure, the controller 108 may be operable to utilize one or more of the sensors to authenticate or verify the identity of the user. For example, the controller may analyze information from the one or more sensors, which may comprise biometric, fingerprint and/or retina scan sensors, to authenticate or verify an identity of the user. The controller 108 may cause visual cues to be presented by the WCD 102, and/or audio cues to be generated by the one or more speakers 122, which may enable the user to become familiar with and be able to operate the device 100. The controller 108 may also cause, for example, a keyboard to be displayed on the WCD 102 that may enable the user to interact with the device 100 by entering information on the WCD 102. The controller 108 may also cause, for example, speech to be received via the one or more microphones 120 to enable the user to interact with the device 100 by speaking. In this regard, the controller 108 may generate an interactive dialog that may enable the user to interact with the device 100.

In accordance with an embodiment of the disclosure, the controller 108 may be operable to merge the stored digital representation of the captured written, and/or drawn content, and the stored data representative of the captured image of the user to maintain synchronicity. In this regard, the controller 108 may be operable to maintain synchronicity during the merging based on, for example, timestamps that may be associated with the captured written, and/or drawn content, and the captured image of the user.

The image projection device 106 may comprise suitable logic, circuitry, optics, interfaces, and/or code that may be operable to receive the merged signal representative of the captured image of the user and written and/or drawn content from the controller 108. The IPD 106 may be operable to project content corresponding to the merged signal that is received from the controller 108 on the WCD 102. In this regard, the IPD 106 may be positioned within the enclosure or housing 101 so that the output of the IPD 106 comprising the projected content is projected on to the surface of the opaque WCD 102. For example, as shown in FIG. 1A, the IPD 106 is located at a lower portion of the enclosure or housing 101 where its projected output of the IPD 106 has an un-obstructed path towards the WCD 102. It should readily be understood that the positioning of the IPD 106 is not limited to the location shown in FIG. 1A. Accordingly, the IPD 106 may be positioned at a plurality other locations within the enclosure or housing 101 where the projected output of the IPD 106 has an un-obstructed path towards the WCD 102, without departing from the spirit and scope of the invention. For example, the IPD 106 may be positioned at any location within the enclosure or housing 101 where the projected output path of the IPD 106 towards the WCD 102 is not obstructed by the ICD 104.

The one or more sensors 118 may comprise suitable logic, circuitry, interfaces, and/or code that may be operable to assist a user with operating and interacting with the device 100. In this regard, the one or more sensors 118 may be operable to control, assist and/or manage interaction of the user with the WCD 102. The one or more sensors 118 may comprise, for example, proximity sensors, motion sensors, fingerprint sensors, and/or retina scan sensors. The one or more sensors 118 may be utilized to detect the presence of the user when the user approaches and faces the WCD 102. The one or more microphones 120, in conjunction with the one or more sensors 118 may be utilized by the controller 108 to detect the presence of the user when the user approaches and faces the WCD 102. In this regard, the one or more microphones 120 may be operable to detect sounds made by the user when the user approaches and faces the WCD 102.

The proximity sensors and/or the motion sensors may be utilized to properly position the user before the writing capture device 102. In this regard, the proximity sensors and/or the motion sensors may be utilized to detect the position of the user and based on the detected position of the user, the controller may be operable to generate audio cues via the speaker 122 and/or visual cues by the IPD 106, and the WCD 102 to prompt the user to a proper position.

In some embodiments of the disclosure, the controller 108 may be operable to utilize the one or more sensors 118 to authenticate or verify an identity of the user. For example, the controller 108 may analyze information from the biometric, fingerprint and/or retina scan sensors, to authenticate or verify an identity of the user.

The controller 108 may also cause, for example, a keyboard to be displayed on the WCD 102 that may enable the user to interact with the device 100 by entering information on the WCD 102. The controller 108 may also cause, for example, speech to be received via the one or more microphones 120 to enable the user to interact with the device 100 by speaking. In this regard, the controller 108 may generate an interactive dialog that may enable the user to interact with the device 100.

The one or more microphones 120 may comprise suitable logic, circuitry, interfaces, and/or code that may be operable to capture speech from the user and/or detect sounds made by a user. For example, speech audio from the user may be utilized to authenticate and/or verify the user. In another example, sounds made by the user as the user approaches the WCD 102 of the device 100 may be detected by the one or more microphones 120 and utilized to detect the presence of the user in front of the WCD 102.

The speaker 122 may comprise suitable logic, circuitry, interfaces, and/or code that may be operable to generate output audio from the device 100. The controller 108 may cause visual cues to be presented by the WCD 102 and IPD 106, and/or audio cues to be generated by the one or more speakers 122, which may prompt a user to operate various functions of the device 100.

In an exemplary operation of the device 100, a user may approach the device 100 in order to generate content and enable publication of the content via the multicast network operator 508 (FIG. 5) and/or the social media network 516 (FIG. 5). The controller 108 may be operable to cause the one or more sensors 118, and/or the one or more microphones 120 in the device 100 to sense and detect the presence of the user. Upon detection of the presence of the user, the controller 108 may be operable to initiate, for example, an authentication process that authenticates or verifies an identity of the user. A dialog initiated by the controller 108 based on sensed information received from the one or more sensors 118, which may include biometric, fingerprint and/or retina scan sensors, may be utilized to authenticate or verify the identity of the user. Speech detected by the one or more microphones 120 may also be utilized to authenticate or verify the identity of the user. Facial recognition executed by, for example, the controller 102 based on an image of the user, which is captured by the ICD 104, may be utilized to authenticate or verify the user.

The controller 108 may also be operable to generate a dialog to enable the user to interact with the device 100. In accordance with various embodiments of the disclosure, the dialogs generated by the controller 108 may comprise visual and/or audio content. Visual content may be displayed on the WCD 102 via the IPD 106, and audio content may be played through the speaker 122. The controller 108 may generate a dialog that may enable the user to position themself properly in front of the WCD 102 to provide optimal capture of the user by the ICD 104, and optimal viewing of the content presented on the WCD 102 by the IPD 106. The controller 108 may utilize sensed information from the one or more sensors 118 such as the proximity sensors to determine whether the user is properly positioned in front of the WCD 102.

Once the controller 108 determines that the user is properly positioned in front of the WCD 102, the controller may cause a dialog which indicates when capturing of the users' image and capturing of the drawing and/or writing by the WCD 102 will begin. For example, the controller 108 may cause the display of visual cues on the monitor 206 and/or audio cues which are out from the one or more speakers 122 as part of the dialog.

Figure 1B:
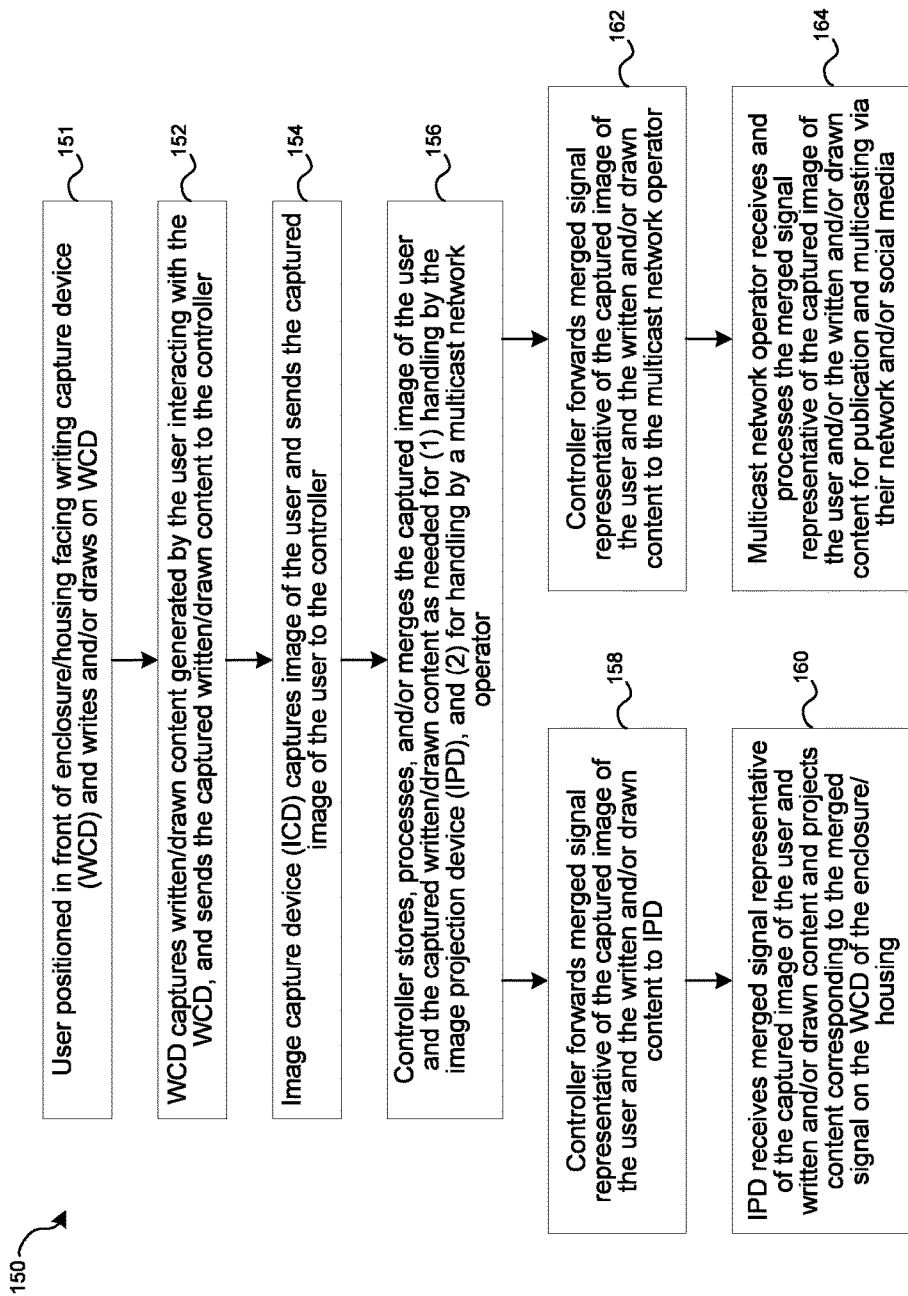
FIG. 1B is a flow chart illustrating exemplary steps for operation of the system for production and capture of content for linear broadcast and publication, as illustrated in FIG. 1A, in accordance with an exemplary embodiment of the disclosure.

Exemplary operations for capturing and displaying of the users' image and the drawn and/or written content by the device 150 are illustrated in FIG. 1B.

FIG. 1B is a flow chart illustrating exemplary steps for operation of the system for production and capture of content for linear broadcast and publication, as illustrated in FIG. 1A, in accordance with an exemplary embodiment of the disclosure. Referring to FIG. 1B, there is shown exemplary flowchart 150 comprising steps 151 through 166. While, for purposes of simplicity of explanation, the method that is illustrated by the flow chart of FIG. 1B is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In step 151, a user is positioned in front of the enclosure or housing 201 facing the writing capture device (WCD) 102 and writes and/or draws on the WCD 102. In step 152, the WCD 102 captures the written and/or drawn content generated by the user interacting with the WCD 102, and the WCD sends the captured written and/or drawn content to the controller. In step 154, the image capture device (ICD) 104 captures an image of the user and sends the captured image of the user to the controller 108. In step 156, the controller 108 stores, processes, and/or merges the captured image of the user and the captured written and/or drawn content as needed for (1) handling by the image projection device (IPD) 106, and (2) for handling by a multicast network operator.

In step 158, the controller 108 may forward the merged signal representative of the captured image of the user and the written and/or drawn content to the IPD 106. In step 160, the IPD 106 receives the merged signal representative of the captured image of the user and written and/or drawn content and projects content corresponding to the merged signal on the WCD 102 of the enclosure or housing 101.

In step 162, the controller 108 may forward the merged signal representative of the captured image of the user and the written and/or drawn content to a multicast network operator 508 (FIG. 5). In step 164, the multicast network operator 508 (FIG. 5) receives and processes the merged signal representative of the captured image of the user and/or the written and/or drawn content for publication and multicasting via their network and/or social media network 516 (FIG. 5).

Figure 2A:
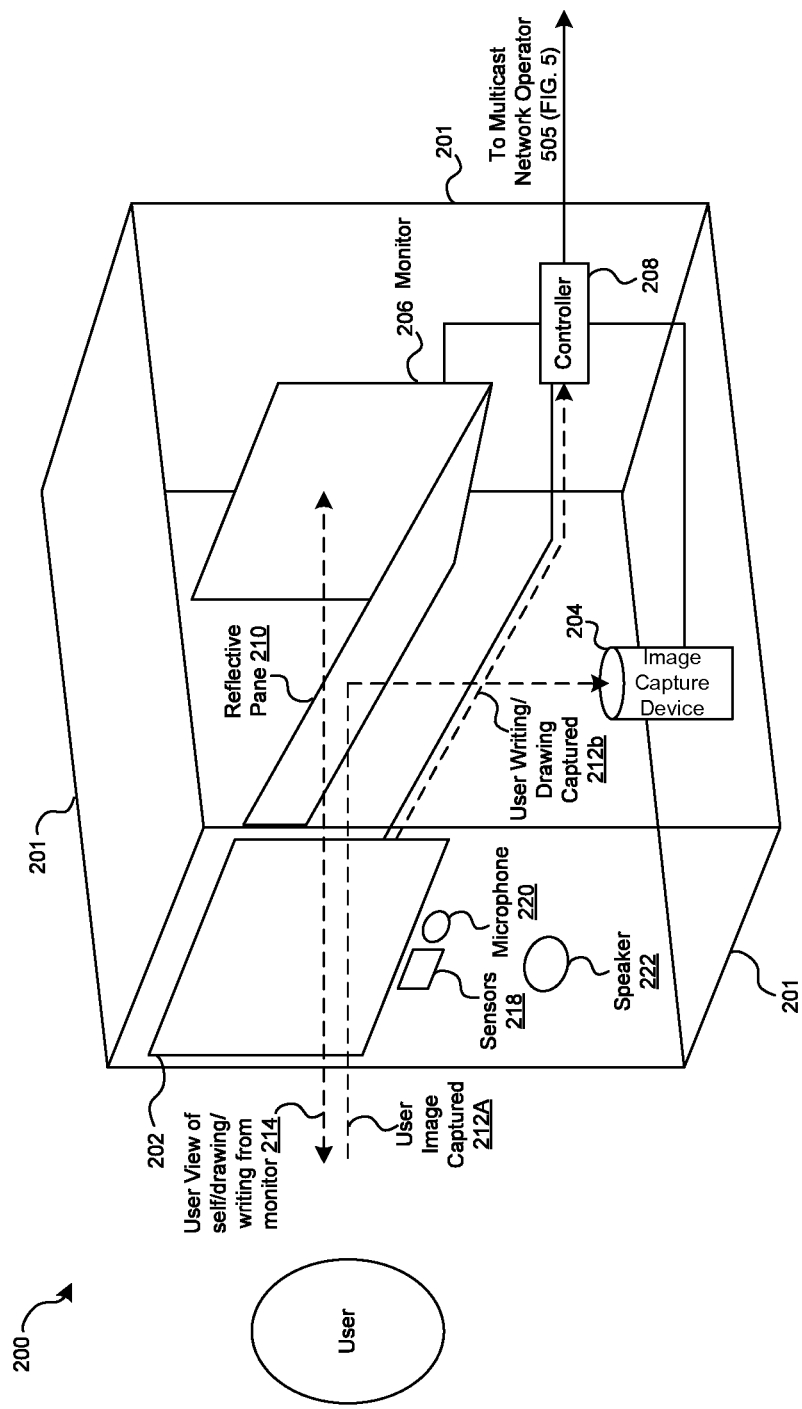
FIG. 2A is a block diagram of an exemplary system for production and capture of content for linear broadcast and publication, in accordance with an exemplary embodiment of the disclosure.

FIG. 2A is a block diagram of an exemplary system for production and capture of content for linear broadcast and publication, in accordance with an exemplary embodiment of the disclosure. Referring to FIG. 2A, there is shown a device 200 that may be utilized for production and capture of content for linear broadcast and publication. The device 200 may comprise an enclosure or housing 201, a writing capture device (WCD) 202, an image capture device (ICD) 204, a monitor 206, a controller 208, and a reflective pane 210. In some embodiments of the disclosure, the device 200 may comprise one or more sensors 218, one or more microphones 220, and one or more speakers 222. The device 200 may be referred to as a content generation device. Reference 212a represents the image of the user being captured by the ICD 204 after it passes through the WCD 202, and is reflected by the reflective pane 210. Reference 212b represents the drawing and/or writing generated by the user, which is captured by the WCD 202, being communicated to the controller 208. Reference 214 represents the users' view of themself, drawing and/or writing, which is unreflected by the reflective pane 210, and is presented on the monitor 206.

The device 101 illustrated in FIG. 1A is similar in some respects to the device 201, which is illustrated in FIG. 2A. However, the device 201 comprises a monitor 206, and reflective pane 210, which are not present in device 101. Also, the IPD 106, which is present in the device 101, is not present in the device 201.

The enclosure or housing 201 may comprise a structure for mounting the components comprising the WCD 202, the ICD 204, the monitor 206, the controller 208, the one or more sensors 218, the one or more microphones, and the one or more speakers 222. The arrangement and/or mounting of the one or more sensors 218, the one or more microphones 220, and/or the one or more speakers 222 may be substantially similar to the arrangement and/or mounting of one or more sensors 118, the one or more microphones 120, and/or the one or more speakers 222, which are illustrated in and described with respect to FIG. 1A. Similarly, the frame and structure of the enclosure or housing 201 may be substantially similar to the frame and structure of the enclosure or housing 101, which are illustrated in and described with respect to FIG. 1A.

The WCD 202 may comprise suitable logic, circuitry, interfaces, and/or code that may be operable to capture writing, and/or drawings that are made on the surface of the WCD 202. In this regard, the WCD 202 may be operable to capture written, and/or drawn content and generate compressed or uncompressed data that may be communicated to the controller 208 for processing. The WCD 202 may be opaque so that the writing and/or drawing made by the user may be captured by the WCD 202, concurrently with the image of the user being reflected by the reflective pane 210 and captured by the ICD 204, and with the user being able to view a merged signal representative of the captured image of the user and written and/or drawn content that is being displayed or presented by the monitor 206. The user may write on the WCD 202 utilizing a finger, stylus, pen, or other similar type of writing implement. In an exemplary embodiment of the disclosure, the user may use gestures which may be translated into text and/or otherwise interpreted by the controller 208. The gestures may be utilized to interact with the device 200.

The WCD 202 may comprise, for example, a touchfoil film, which may be sandwiched between a rear production film and a protective glass. The touchfoil film is made by visualplanet.

The ICD 204 may comprise suitable logic, circuitry, optics, interfaces, and/or code that may be operable to capture an image of the user, which passes through the opaque screen of the WCD 202, and is reflected by the reflective pane 210. The ICD 204 may be positioned within the enclosure or housing 201 behind the WCD 102 so that the image of the user, which passes through the opaque surface WCD 102, and is reflected by the reflective pane 210, is captured by the ICD 204. The ICD 204 may be substantially similar to the ICD 104, which is illustrated in and described with respect to FIG. 1A. In this regard, the ICD 204 may comprise, for example, a digital camera or a video camera, which may be operable to capture still and/or video images.

The image of the user that is captured by the ICD 204 may comprise still and/or moving images. The ICD 204 may be operable to generate compressed or uncompressed data representative of the captured image of the user to the controller 208 for processing. For example, the compressed or uncompressed data representative of the captured image of the user may be communicated to the controller 208 in a file. For a still captured image, the file may comprise, for example, a JPEG, GIF, PNG, and/or other format. For a moving captured image, the file may comprise, for example, a MPEG 2 or variants thereof (for example, AVC) file. In various embodiments of the disclosure, the ICD 204 may comprise a digital camera, or a video camera. In accordance with an embodiment of the disclosure, the capturing of the writing, and/or drawings that are made on the surface of the WCD 202 and the capturing, by the ICD 204, of the image of the user that passes through the opaque screen of the WCD 202, and is reflected by the reflective pane 210, may be done in a synchronous manner.

The controller 208 may comprise suitable logic, circuitry, interfaces, and/or code that may be operable to control various operations of the device 100. The controller 208 may be substantially similar to the controller 108, which is illustrated in and described with respect to FIG. 1A. The controller 208 may also be operable to communicate with a remote operations terminal 504 (FIG. 5) which may be utilized for operations, administration, maintenance, and provisioning of the device 200. The controller 208 may be operable to store, process, and/or merge the captured image of the user and the captured written and/or drawn content as needed for (1) handling by the monitor 206, and (2) for handling by a multicast network operator 508 (FIG. 5). In this regard, the controller 208 may be operable to store the captured written, and/or drawn content received from the controller 208, and also the data representative of the captured image of the user. For example, the controller 208 may be operable to store a digital representation of the captured written, and/or drawn content received from the controller WCD 208, and also the data representative of the captured image of the user, which is received from the ICD 204, in memory 502C (FIG. 5). The controller 208 may utilize one or more CODECS, which may be utilized by the controller 208 to process the stored digital representation of the captured written, and/or drawn content, and the stored data representative of the captured image of the user. As part of the processing, the controller 208 may be operable to merge the stored digital representation of the captured written, and/or drawn content, and the stored data representative of the captured image of the user to generate a merged signal or merged content. The controller 208 may forward or otherwise communicate the merged signal representative of the captured image of the user and the written and/or drawn content to the monitor 206. The controller 208 may be operable to encapsulate a packetized version of the merged signal representative of the captured image of the user and the written and/or drawn content into one or more IP packets or datagrams. The one or more IP packets or datagrams may be communicated to the multicast network operator 508 (FIG. 5). The WCD 202, ICD 204, the monitor 206, the one or more sensors 118, the one or more microphones 220, and/or the one or more speakers 222 may be coupled to and/or controlled by the controller 208.

The controller 208 may be operable to control and manage interaction of the user with the WCD 102. For example, the one or more sensors 218 may be utilized to detect the presence of the user when the user approaches and faces the WCD 202. The one or more microphones 220, in conjunction with the one or more sensors may be utilized by the controller 208 to detect the presence of the user when the user approaches and faces the WCD 202. In this regard, the one or more microphones 220 may be operable to detect sounds made by the user when the user approaches and faces the WCD 202. In some embodiments of the disclosure, the controller 208 may be operable to utilize one or more of the sensors to authenticate or verify the identity of the user. For example, the controller may analyze information from the one or more sensors, which may comprise biometric, fingerprint and/or retina scan sensors, to authenticate or verify an identity of the user. The controller 208 may cause visual cues to be presented by the WCD 202, and/or audio cues to be generated by the one or more speakers 222, which may enable the user to become familiar with and be able to operate the device 200. The controller 208 may also cause, for example, a keyboard to be displayed on the WCD 102 that may enable the user to interact with the device 200 by entering information on the WCD 202. The controller 208 may also cause, for example, speech to be received via the one or more microphones 220 to enable the user to interact with the device 200 by speaking. In this regard, the controller 208 may generate an interactive dialog that may enable the user to interact with the device 200.

In accordance with an embodiment of the disclosure, the controller 208 may be operable to merge the stored digital representation of the captured written, and/or drawn content, and the stored data representative of the captured image of the user to maintain synchronicity. In this regard, the controller 208 may be operable to maintain synchronicity during the merging based on, for example, timestamps that may be associated with the captured written, and/or drawn content, and the captured image of the user.

The reflective pane 210 may comprise a beamsplitter glass, which may be referred to as a reflective glass. One side of the reflective pane 210 is mirror coated, and the other side has an antireflective coating. The antireflective coated side, which is the beamsplitter side, of the reflective pane 210 may have varying degrees of reflectance such as, for example, 50%, 40%, and 30% as measured at 45 degrees with the beamsplitter side as the front surface. Transmission values of the reflective pane are dependent on the reflection, coating absorption, and glass thickness of the reflective pane 210. The reflective pane 210 may comprise, for example, 45 degree beamsplitters, and is high definition compatible. Exemplary dimensions of the reflective pane 210 may be 22"×27" (height×width), 40R/60T (Reflectance(R)/Transmission(T)), 5/32" thickness. The reflective pane has a reflectance in a range of 30%-50% and a transmission in a range of 46%-66% measured at a beam-splitter side of the reflective pane.

The monitor 206 may comprise suitable logic, circuitry, optics, interfaces, and/or code that may be operable to receive the merged signal representative of the captured image of the user and written and/or drawn content from the controller 108. The monitor 206 may be operable to display or present content corresponding to the merged signal that is received from the controller 208. In this regard, the monitor 206 may be positioned within the enclosure or housing 201 so that the output of the monitor 206 comprising the displayed content is visible by the user through the reflective pane 210 and the opaque WCD 202. In this regard, the content that is displayed by the monitor, which is viewed by the user, is not reflected by the reflected pane 210. As shown in FIG. 2A, the monitor 206 may be located behind both the WCD 202, and the reflective pane 210, and the view of the monitor by the user is not reflected by the reflective pane 210.

The one or more sensors 218 may comprise suitable logic, circuitry, interfaces, and/or code that may be operable to assist a user with operating and interacting with the device 200. In this regard, the one or more sensors 118 may be operable to control, assist and/or manage interaction of the user with the WCD 102. The one or more sensors 218 may be substantially similar to, and may function and operate similar to the one or more sensors 118, which are shown in and described with respect to FIG. 1A. The one or more sensors 218 may comprise, for example, proximity sensors, motion sensors, fingerprint sensors, and/or retina scan sensors.

The proximity sensors and/or the motion sensors may be utilized to properly position the user before the writing capture device 202. In this regard, the proximity sensors and/or the motion sensors may be utilized to detect the position of the user and based on the detected position of the user, the controller may be operable to generate audio cues via the speaker 222 and/or visual cues by the monitor 206, to prompt the user to a proper position.

The controller 208 may also cause, for example, a keyboard to be displayed on the WCD 202 that may enable the user to interact with the device 100 by entering information on the WCD 202 and causing it to be displayed on the monitor 206. The controller 208 may also cause, for example, speech to be received via the one or more microphones 220 to enable the user to interact with the device 100 by speaking. In this regard, the controller 108 may generate an interactive dialog that may enable the user to interact with the device 200.

The one or more microphones 220 may comprise suitable logic, circuitry, interfaces, and/or code that may be operable to capture speech from the user and/or detect sounds made by a user. The one or more microphones 220 may be substantially similar to, and may function and operate similar to the one or more microphones 120, which are shown in and described with respect to FIG. 1A.

The one or more speakers 222 may comprise suitable logic, circuitry, interfaces, and/or code that may be operable to generate output audio from the device 200. The one or more speakers 222 may be substantially similar to, and may function and operate similar to the one or more speakers 122, which are shown in and described with respect to FIG. 1A. For example, the controller 208 may cause visual cues to be presented by the monitor 206, and/or audio cues to be generated by the one or more speakers 222, which may prompt a user to operate various functions of the device 200.

In an exemplary operation of the device 200, a user may approach the device 200 in order to generate content and enable publication of the content via the multicast network operator 508 (FIG. 5) and/or the social media network 516 (FIG. 5). The controller 208 may be operable to cause the one or more sensors 118, and/or the one or more microphones 220 in the device 200 to sense and detect the presence of the user. Upon detection of the presence of the user, the controller 208 may be operable to initiate, for example, an authentication process that authenticates or verifies an identity of the user. A dialog initiated by the controller 208 based on sensed information from the one or more sensors 218, which may include biometric, fingerprint and/or retina scan sensors, may be utilized to authenticate or verify the identity of the user. Speech detected by the one or more microphones 220 may also be utilized to authenticate or verify the identity of the user. Facial recognition executed by, for example, the controller 202 based on an image of the user, which is captured by the ICD 204, may be utilized to authenticate or verify the user.

The controller 208 may also be operable to generate a dialog to enable the user to interact with the device 200. In accordance with various embodiments of the disclosure, the dialogs generated by the controller 208 may comprise visual and/or audio content. The visual content may be displayed on the monitor 206, and the audio content may be played through the one or more speakers 222. The controller 208 may generate a dialog that may enable the user to position themself properly in front of the WCD 202 to provide optimal capture of the user by the ICD 204, and optimal viewing of the content presented on the monitor 206. The controller 208 may utilize sensed information from the one or more sensors 218 such as the proximity sensors to determine whether the user is properly positioned in front of the WCD 202.

Once the controller 208 determines that the user is properly positioned in front of the WCD 202, the controller 208 may cause a dialog which indicates when capturing of the users' image and capturing of the drawing and/or writing by the WCD 202 will begin. For example, the controller 208 may cause the display of visual cues on the monitor 206 and/or audio cues which are out from the one or more speakers 222 as part of the dialog.

Figure 2B:
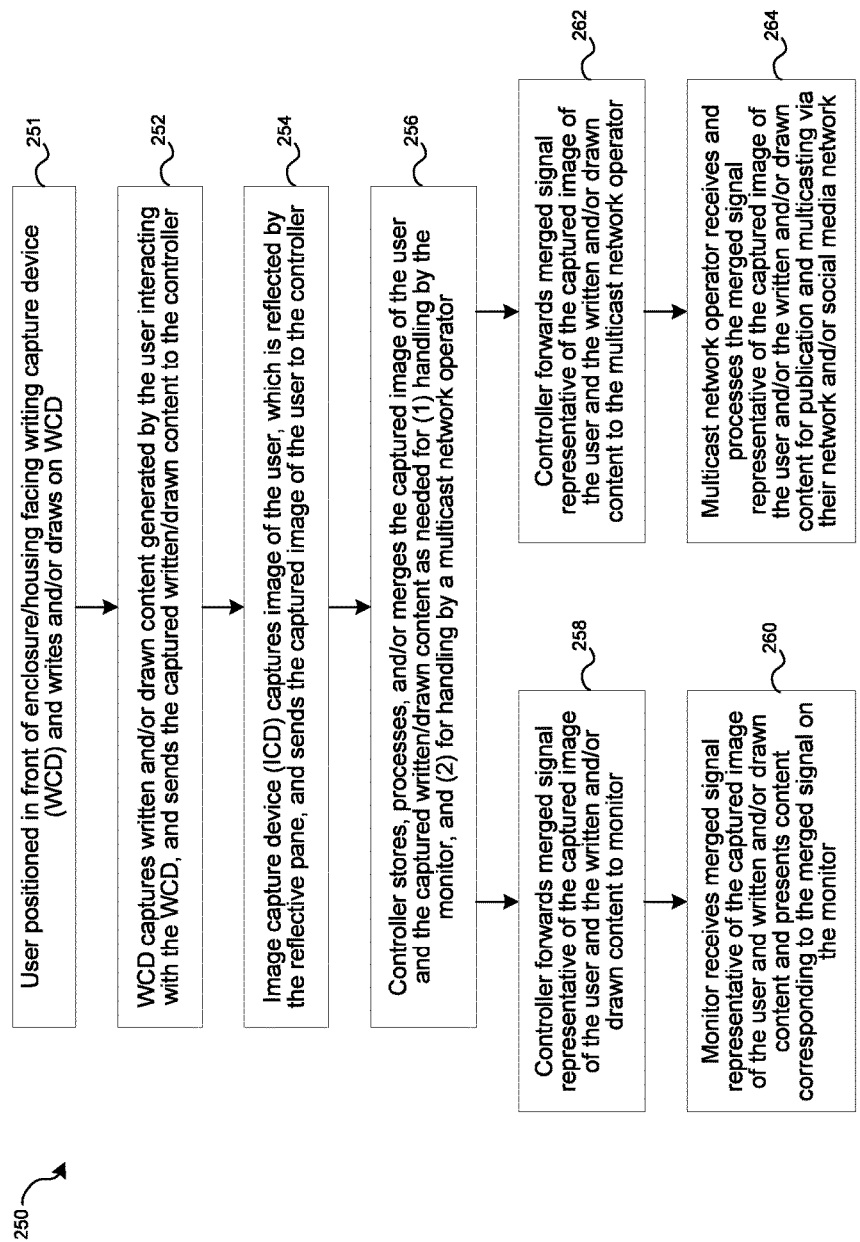
FIG. 2B is a flow chart illustrating exemplary steps for operation of the system for production and capture of content for linear broadcast and publication, as illustrated in FIG. 2A, in accordance with an exemplary embodiment of the disclosure.

Exemplary operations for capturing and displaying of the users' image and the drawn and/or written content by the device 250 are illustrated in FIG. 2B.

FIG. 2B is a flow chart illustrating exemplary steps for operation of the system for production and capture of content for linear broadcast and publication, as illustrated in FIG. 2A, in accordance with an exemplary embodiment of the disclosure. Referring to FIG. 2B, there is shown exemplary flowchart 250 comprising steps 251 through 266. While, for purposes of simplicity of explanation, the method that is illustrated by the flow chart of FIG. 2B is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In step 251, the user is positioned in front of the enclosure or housing 201 facing writing capture device (WCD) 302 and writes and/or draws on WCD 302. In step 252, the WCD 302 captures written and/or drawn content generated by the user interacting with the WCD 302, and sends the captured written/drawn content to the controller 208. In step 254, the image capture device (ICD) 204 captures an image of the user, which is reflected by the reflective pane 210, and sends the captured image of the user to the controller 208. In step 256, the controller 208 stores, processes, and/or merges the captured image of the user and the captured written/drawn content as needed for (1) handling by the monitor 206r, and (2) for handling by a multicast network operator 508 (FIG. 5).

In step 258, the controller 208 may forward merged signal representative of the captured image of the user and the written and/or drawn content to the monitor 206. In step 260, the monitor 206 receives the merged signal representative of the captured image of the user and written and/or drawn content and presents content corresponding to the merged signal on the monitor 206.

In step 262, the controller 208 may forward the merged signal representative of the captured image of the user and the written and/or drawn content to the multicast network operator 508 (FIG. 5). In step 264, the multicast network operator 508 (FIG. 5) receives and processes the merged signal representative of the captured image of the user and/or the written and/or drawn content for publication and multicasting via their network and/or social media network 516 (FIG. 5).

Figure 3A:
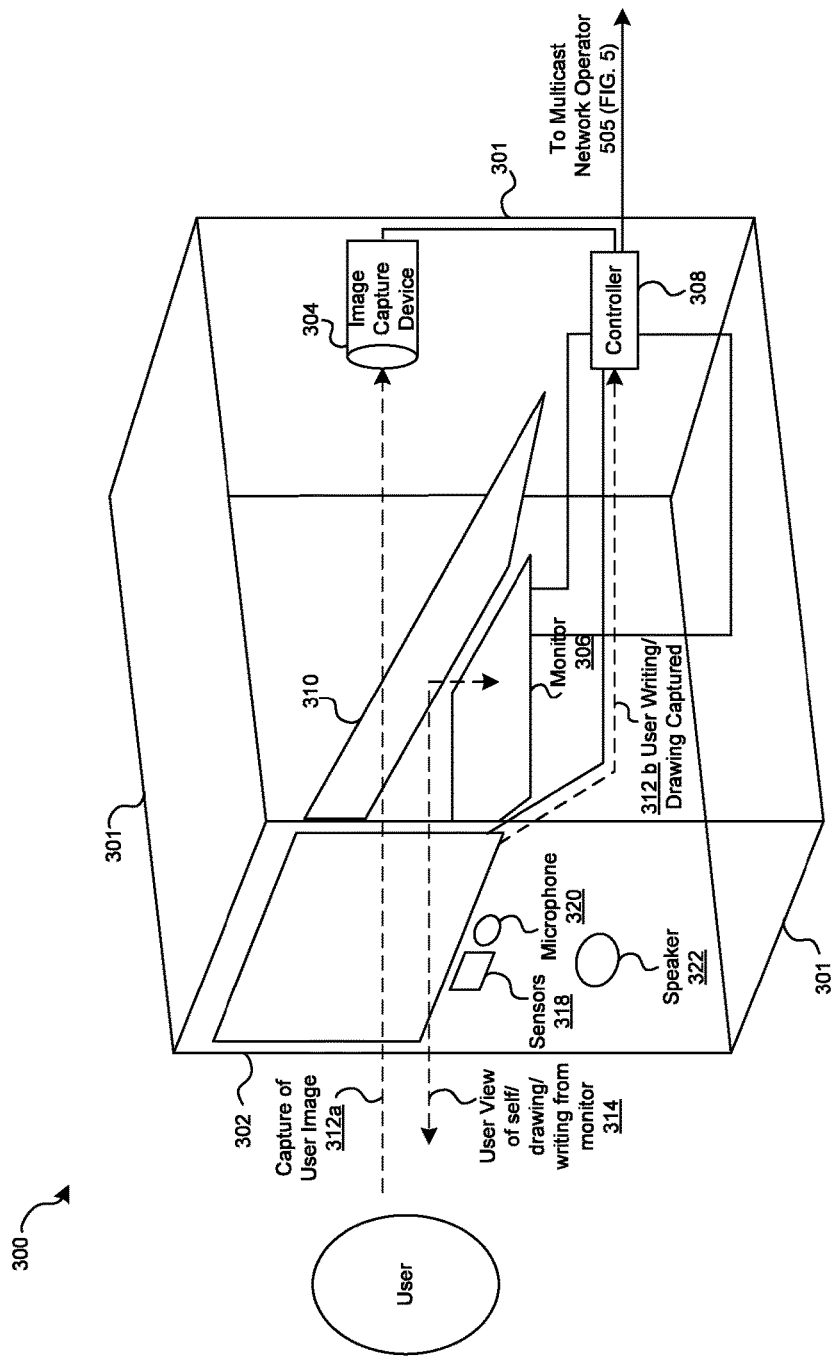
FIG. 3A is a block diagram of an exemplary system for production and capture of content for linear broadcast and publication, in accordance with an exemplary embodiment of the disclosure.

FIG. 3A is a block diagram of an exemplary system for production and capture of content for linear broadcast and publication, in accordance with an exemplary embodiment of the disclosure. Referring to FIG. 3A, there is shown a device 300 that may be utilized for production and capture of content for linear broadcast and publication. The device 300 may comprise an enclosure or housing 301, a writing capture device (WCD) 302, an image capture device (ICD) 304, a monitor 306, a controller 308, and a reflective pane 310. In some embodiments of the disclosure, the device 300 may comprise one or more sensors 318, one or more microphones 320, and one or more speakers 322. The device 300 may be referred to as a content generation device. Reference 312a represents the image of the user being captured by the ICD 304 after it passes through the WCD 302, and is unreflected by the reflective pane 310. Reference 312b represents the drawing and/or writing generated by the user, which is captured by the WCD 302, being communicated to the controller 308. Reference 314 represents the users' view of themselves, drawing and/or writing, which is presented on the monitor 306, and reflected by the reflected pane 310.

The device 301 illustrated in FIG. 3A is similar in some respects to the device 201, which is illustrated in FIG. 2A. However, the monitor 306, and ICD 304, which are illustrated in FIG. 3A are arranged differently from the monitor 206, and ICD 204, which are illustrated in FIG. 2A.

The enclosure or housing 301 may comprise a structure for mounting the components comprising the WCD 302, the ICD 304, the monitor 306, the controller 308, the one or more sensors 318, the one or more microphones 320, and the one or more speakers 322. The arrangement and/or mounting of the one or more sensors 318, the one or more microphones 320, and/or the one or more speakers 322 may be substantially similar to the arrangement and/or mounting of one or more sensors 218, the one or more microphones 220, and/or the one or more speakers 222, which are illustrated in and described with respect to FIG. 2A. Similarly, the frame and structure of the enclosure or housing 301 in FIG. 3A may be substantially similar to the frame and structure of the enclosure or housing 201, which are illustrated in and described with respect to FIG. 2A.

The WCD 302, the ICD 304, the monitor 306, the controller 308, and the reflective pane 310, which are illustrated in FIG. 3A, may be substantially similar to the WCD 202, the ICD 204, the monitor 206, the controller 208, and the reflective pane 210, which are illustrated in FIG. 2A. The user may write on the WCD 302 utilizing a finger, stylus, pen, or other similar type of writing implement. In an exemplary embodiment of the disclosure, the user may use gestures which may be translated into text and/or otherwise interpreted by the controller 308. The gestures may be utilized to interact with the device 300.

The WCD 202 may comprise, for example, a touchfoil film, which may be sandwiched between a rear production film and a protective glass. The touchfoil film is made by visualplanet.

The one or more sensors 318, the one or more microphones 320, and the one or more speakers 322, which are illustrated in FIG. 3A, may be substantially similar to, and may function and operate similar to the one or more sensors 18, the one or more microphones 220, and the one or more speakers 222, which are illustrated in FIG. 2A.

The WCD 302 may comprise suitable logic, circuitry, interfaces, and/or code that may be operable to capture writing, and/or drawings that are made on the surface of the WCD 302 by a user of the device 300. In this regard, the WCD 302 may be operable to capture written, and/or drawn content and generate compressed or uncompressed data that may be communicated to the controller 308 for processing. The WCD 302 may be opaque so that the writing and/or drawing made by the user may be captured by the WCD 302, concurrently with the image of the user being captured by the ICD 304, and with the user being able to view a merged signal representative of the captured image of the user and written and/or drawn content that is displayed or presented by the monitor 306, which has been reflected by the reflective pane 310.

The ICD 304 may comprise suitable logic, circuitry, optics, interfaces, and/or code that may be operable to capture an image of the user, which passes through the opaque screen of the WCD 302, and is not reflected (unreflected) by the reflective pane 310. The ICD 304 may be positioned within the enclosure or housing 301 behind the WCD 302 and behind the reflective pane 310 so that the image of the user, which passes through the opaque surface WCD 302 and is not reflected by the reflective pane 310, is captured by the ICD 304. The ICD 304 may be substantially similar to the ICD 204, which is illustrated in and described with respect to FIG. 2A. In this regard, the ICD 304 may comprise, for example, a digital camera or a video camera, which may be operable to capture still and/or video images.

In accordance with an embodiment of the disclosure, the capturing by the WCD 302 of the writing, and/or drawings that are made on the surface of the WCD 302 and the capturing, by the ICD 304, of the image of the user that passes through the opaque screen of the WCD 302, and is not reflected by the reflective pane 310, may be done in a synchronous manner.

The reflective pane 310 may comprise a beamsplitter glass, which may be referred to as a reflective glass. One side of the reflective pane 310 is mirror coated, and the other side has an antireflective coating. The antireflective coated side, which is the beamsplitter side, of the reflective pane 310 may have varying degrees of reflectance such as, for example, 50%, 40%, and 30% as measured at 45 degrees with the bemsplitter side as the front surface. Transmission values of the reflective pane are dependent on the reflection, coating absorption, and glass thickness of the reflective pane 310. The reflective pane 310 may comprise, for example, 45 degree beamsplitters, and is high definition compatible. The reflective pane has a reflectance in a range of 30%-50% and a transmission in a range of 46%-66% measured at a beam-splitter side of the reflective pane. Exemplary dimensions of the reflective pane 210 may be 22"×27" (height× width), 40R/60T (Reflectance(R)/Transmission(T)), 5/32" thickness. Additional information may be found, for example, at: http://www.teleprompterimirror.com/tele-promptersglass.htm.

The monitor 306 may comprise suitable logic, circuitry, optics, interfaces, and/or code that may be operable to receive the merged signal representative of the captured image of the user and written and/or drawn content from the controller 308. The monitor 306 may be operable to display or present content corresponding to the merged signal that is received from the controller 308. In this regard, the monitor 306 may be positioned within the enclosure or housing 301 so that the output of the monitor 306 comprising the displayed content is reflected by the reflective pane 310 so the output of the monitor 306 is visible by the user through the reflective pane 310 and the opaque WCD 302. As shown in FIG. 3A, the monitor 306 may be located behind both the WCD 302, and below the reflective pane 310, so the content displayed on the monitor 306 is reflected by the reflective pane 310 and is viewable by the user.

Figure 3B:
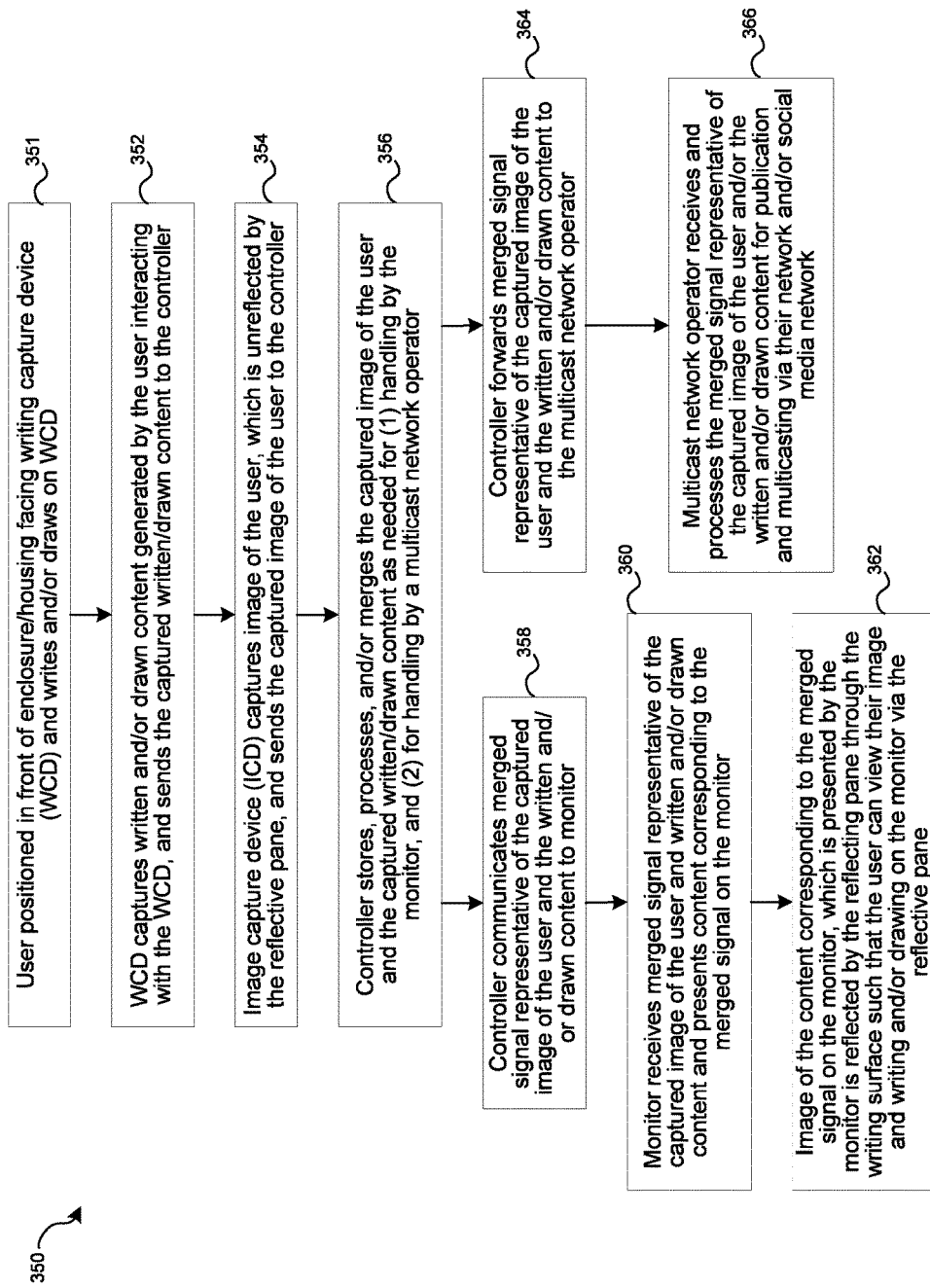
FIG. 3B is a flow chart illustrating exemplary steps for operation of the system for production and capture of content for linear broadcast and publication, as illustrated in FIG. 3A, in accordance with an exemplary embodiment of the disclosure.

Exemplary operations for capturing and displaying of the users' image and the drawn and/or written content by the device 350 are illustrated in FIG. 3B.

FIG. 3B is a flow chart illustrating exemplary steps for operation of the system for production and capture of content for linear broadcast and publication, as illustrated in FIG. 3A, in accordance with an exemplary embodiment of the disclosure. Referring to FIG. 3B, there is shown exemplary flowchart 350 comprising steps 351 through 366. While, for purposes of simplicity of explanation, the method that is illustrated by the flow chart of FIG. 3B is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In step 351, the user is positioned in front of enclosure or housing 301 facing writing capture device (WCD) 302 and writes and/or draws on WCD 302. In step 352, the WCD 301 captures written and/or drawn content generated by the user interacting with the WCD 301, and sends the captured written/drawn content to the controller 308. In step 354, the image capture device (ICD) 304 captures image of the user, which is unreflected by the reflective pane, and sends the captured image of the user to the controller 308. In step 356, the controller stores, processes, and/or merges the captured image of the user and the captured written/drawn content as needed for (1) handling by the monitor 306, and (2) for handling by a multicast network operator 508 (FIG. 5).

In step 358, the controller 308 communicates the merged signal representative of the captured image of the user and the written and/or drawn content to monitor 306. In step 360, the monitor 306 receives merged signal representative of the captured image of the user and written and/or drawn content and presents content corresponding to the merged signal on the monitor 306. In step 362, an image of the content corresponding to the merged signal on the monitor 306, which is presented by the monitor 306, is reflected by the reflecting pane 310 through the writing surface such that the user can view their image and writing and/or drawing on the monitor 306 via the reflective pane 310.

In step 364, the controller 308 may forward the merged signal representative of the captured image of the user and the written and/or drawn content to the multicast network operator 508 (FIG. 5). In step 366, the multicast network operator 508 (FIG. 5) receives and processes the merged signal representative of the captured image of the user and/or the written and/or drawn content for publication and multicasting via their network and/or social media network 516 (FIG. 5).

Figure 4A:
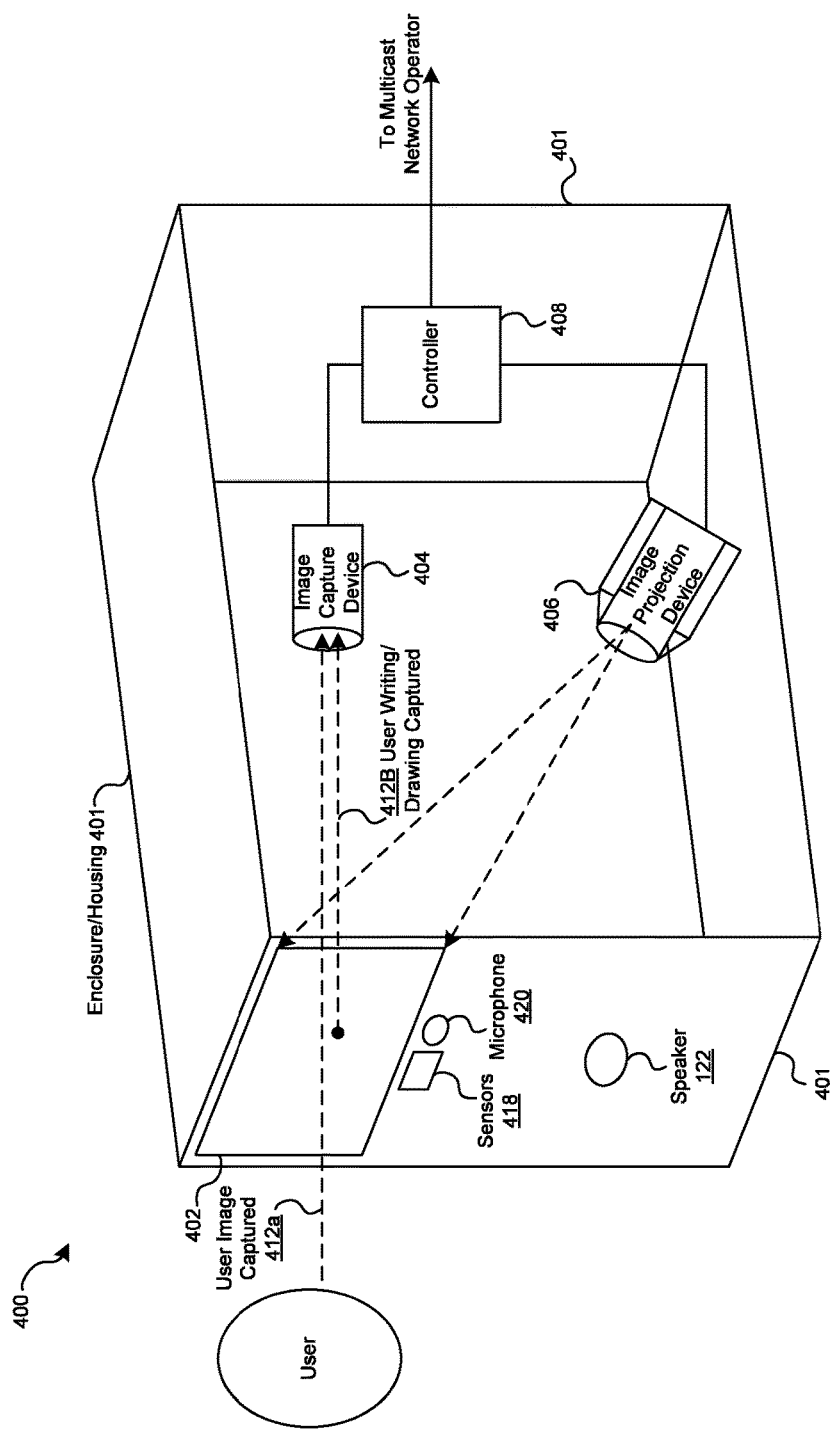
FIG. 4A is a block diagram of an exemplary system for production and capture of content for linear broadcast and publication, in accordance with an exemplary embodiment of the disclosure.

FIG. 4A is a block diagram of an exemplary system for production and capture of content for linear broadcast and publication, in accordance with an exemplary embodiment of the disclosure.

Referring to FIG. 4A, there is shown a device 100 that may be utilized for production and capture of content for linear broadcast and publication. The device 400 may comprise an enclosure or housing 401, a writing surface (WS) 402, an image capture device (ICD) 404, an image projection device (IPD) 406, and a controller 408. In some embodiments of the disclosure, the device 400 may comprise one or more sensors 418, one or more microphones 420, and one or more speakers 422. The device 400 may be referred to as a content generation device. Reference 412a represents the image of the user being captured by the ICD 404 after it passes through the WS 402. Reference 412b represents the drawing and/or writing on the WS 402 being captured by the ICD 404.

The enclosure or housing 401 may comprise a structure for mounting the components comprising the WS 402, the ICD 404, the IPD 406, the controller 408, the one or more sensors 418, the one or more microphones 420, and the one or more speakers 422. The enclosure or housing 401 may be substantially similar to the enclosure or housing 401, which is shown in and described with respect to FIG. 1A.

The WS 402 may comprise an opaque material on which the user may draw and/or write content such that the written and/or drawn content along with an image of the user may be captured by the ICD 404. The WS 402 may also enable the captured written and/or drawn content along with the image of the user to be projected onto the WS 402, where it may be viewed by the user. In an embodiment of the disclosure, the WS 402 may comprise a thin film that may enable the captured written and/or drawn content along with the image of the user to be projected onto the WS 402 with the opacity of the WS 402 being compromised such that a quality of the image of the written and/or drawn content along with an image of the user that is captured by the ICD 404 is not compromised. The WS 402 may comprise, for example, glass, Plexi Glass, or other opaque material or screen.

The ICD 404, the IPD 406, the controller 408, the one or more sensors 418, the one or more microphones 420, and the one or more speakers 422 may be substantially similar to the ICD 104, the IPD 106, the controller 108, the one or more sensors 118, the one or more microphones 120, and the one or more speakers 122, which are shown and described with respect to FIG. 1A.

The ICD 404 may be operable to synchronously capture an image of the written and/or drawn content, which is made by the user, along with an image of the user, through the opaque screen of the WS 402. The ICD 404 may be positioned within the enclosure or housing 401 behind the WS 402 so that the image of the written and/or drawn content along with the image of the user is captured through the opaque surface WS 402 by the ICD 404. The captured image of the written and/or drawn content along with the image of the user may be referred to as captured content. The captured content may comprise still and/or moving images. The ICD 404 may be operable to generate compressed or uncompressed data representative of the captured content, which may be communicated to the controller 408 for processing. For example, the compressed or uncompressed data representative of the captured content may be communicated to the controller 408 in a file. For a still captured image, the file may comprise, for example, a JPEG, GIF, PNG, and/or other format. For a moving captured image, the file may comprise, for example, a MPEG 2 or variants thereof (for example, AVC) file. In various embodiments of the disclosure, the ICD 404 may comprise a digital camera, or a video camera.

The controller 408 may comprise suitable logic, circuitry, interfaces, and/or code that may be operable to control various operations of the device 400. The controller 408 may also be operable to communicate with a remote operations terminal 504 (FIG. 5) which may be utilized for operations, administration, maintenance, and provisioning of the device 400. The controller 408 may be operable to store, and/or process the captured content, which comprises the captured image of the written and/or drawn content along with the image of the user as needed for (1) handling by the IPD 406, and (2) for handling by a multicast network operator 508 (FIG. 5). In this regard, the controller 408 may be operable to store data representative of the captured content received from the ICD 408. For example, the controller 408 may be operable to store a digital representation of the captured content, which is received from the ICD 404 in memory 502C (FIG. 5). The controller 408 may utilize one or more CODECS, which may be utilized by the controller 408 to process the stored digital representation of the captured content. As part of the processing, the controller 408 may be operable to perform function such as decoding, encoding, and/or transcoding of the stored digital representation of the captured content. The controller 408 may forward or otherwise communicate the processed signal representative of the captured content to the IPD 406. The controller 408 may be operable to encapsulate a packetized version of the merged signal representative of the captured content into one or more IP packets or datagrams. The one or more IP packets or datagrams may be communicated to the multicast network operator 508 (FIG. 5). The WS 402, the ICD 404, the IPD 406, the one or more sensors 418, the one or more microphones 420, and/or the one or more speakers 422 may be coupled to and/or controlled by the controller 408.

The controller 408 may be operable to control and manage interaction of the user with the WS 402. For example, the one or more sensors 418 may be utilized to detect the presence of the user when the user approaches and faces the WS 402. The one or more microphones 420, in conjunction with the one or more sensors 418 may be utilized by the controller 408 to detect the presence of the user when the user approaches and faces the WS 402. In this regard, the one or more microphones 420 may be operable to detect sounds made by the user when the user approaches and faces the WS 402. In some embodiments of the disclosure, the controller 408 may be operable to utilize one or more of the sensors to authenticate or verify the identity of the user. For example, the controller 408 may analyze information from the one or more sensors 418, which may comprise biometric, fingerprint and/or retina scan sensors, to authenticate or verify an identity of the user. The controller 408 may cause visual cues to be presented by the WCD 402, and/or audio cues to be generated by the one or more speakers 422, which may enable the user to become familiar with and be able to operate the device 400. The controller 408 may also cause, for example, to be received via the one or more microphones 420 to enable the user to interact with the device 400 by speaking. The speech may comprise operation guides, help and guidance with operating the device 400. In this regard, the controller 408 may generate an interactive dialog that may enable the user to interact with the device 400.

The image projection device 406 may comprise suitable logic, circuitry, optics, interfaces, and/or code that may be operable to receive the processed signal representative of the captured content from the controller 408. The IPD 406 may be operable to project content corresponding to the merged signal that is received from the controller 408 on the WS 402. In this regard, the IPD 406 may be positioned within the enclosure or housing 401 so that the output of the IPD 406 comprising the projected content is projected on to the surface of the opaque WS 402. For example, as shown in FIG. 4A, the IPD 406 is located at a lower portion of the enclosure or housing 401 where its projected output of the IPD 406 has an un-obstructed path towards the WS 402. It should readily be understood that the positioning of the IPD 406 is not limited to the location shown in FIG. 4A. Accordingly, the IPD 406 may be positioned at a plurality other locations within the enclosure or housing 401 where the projected output of the IPD 406 has an un-obstructed path towards the WS 402, without departing from the spirit and scope of the invention. For example, similar to FIG. 1A, the IPD 406 may be positioned at any location within the enclosure or housing 401 where the projected output path of the IPD 406 towards the WS 402 is not obstructed by the ICD 404.

The operation and function of the one or more sensors 418, the one or more microphones 420, and one or more speakers 422 may be similar to the operation of the one or more sensors, the one or more microphones, and one or more speakers, which are shown in and described with respect to FIGS. 1A, 2A, and 3A, respectively.

In an exemplary operation of the device 400, a user may approach the device 400 in order to generate content and enable publication of the content via the multicast network operator 508 (FIG. 5) and/or the social media network 516 (FIG. 5). The controller 408 may be operable to cause the one or more sensors 418, and/or the one or more microphones 420 in the device 400 to sense and detect the presence of the user. Upon detection of the presence of the user, the controller 408 may be operable to initiate, for example, an authentication process that authenticates or verifies an identity of the user. A dialog initiated by the controller 408 based on sensed information received from the one or more sensors 418, which may include biometric, fingerprint and/or retina scan sensors, may be utilized to authenticate or verify the identity of the user. Speech from the use detected by the one or more microphones 420 may also be utilized to authenticate or verify the identity of the user. Facial recognition executed by, for example, the controller 402 based on an image of the user, which is captured by the ICD 404, may be utilized to authenticate or verify the user.

The controller 408 may also be operable to generate a dialog to enable the user to interact with the device 400. In accordance with various embodiments of the disclosure, the dialogs generated by the controller 408 may comprise visual and/or audio content. Visual content may be displayed on the WS 402 via the IPD 406, and audio content may be played through the speaker 422. The controller 408 may generate a dialog that may enable the user to position themself properly in front of the WCD 402 to provide optimal capture of the user by the ICD 404, and optimal viewing of the content presented on the WCD 402 by the IPD 406. The controller 408 may utilize sensed information from the one or more sensors 418 such as the proximity sensors to determine whether the user is properly positioned in front of the WS 402.

Once the controller 408 determines that the user is properly positioned in front of the WCD 402, the controller may cause a dialog which indicates when capturing of the users' image and capturing of the drawing and/or writing by the WCD 402 will begin. For example, the controller 408 may cause the display of visual cues on the monitor 406 and/or audio cues which are out from the one or more speakers 422 as part of the dialog.

Figure 4B:
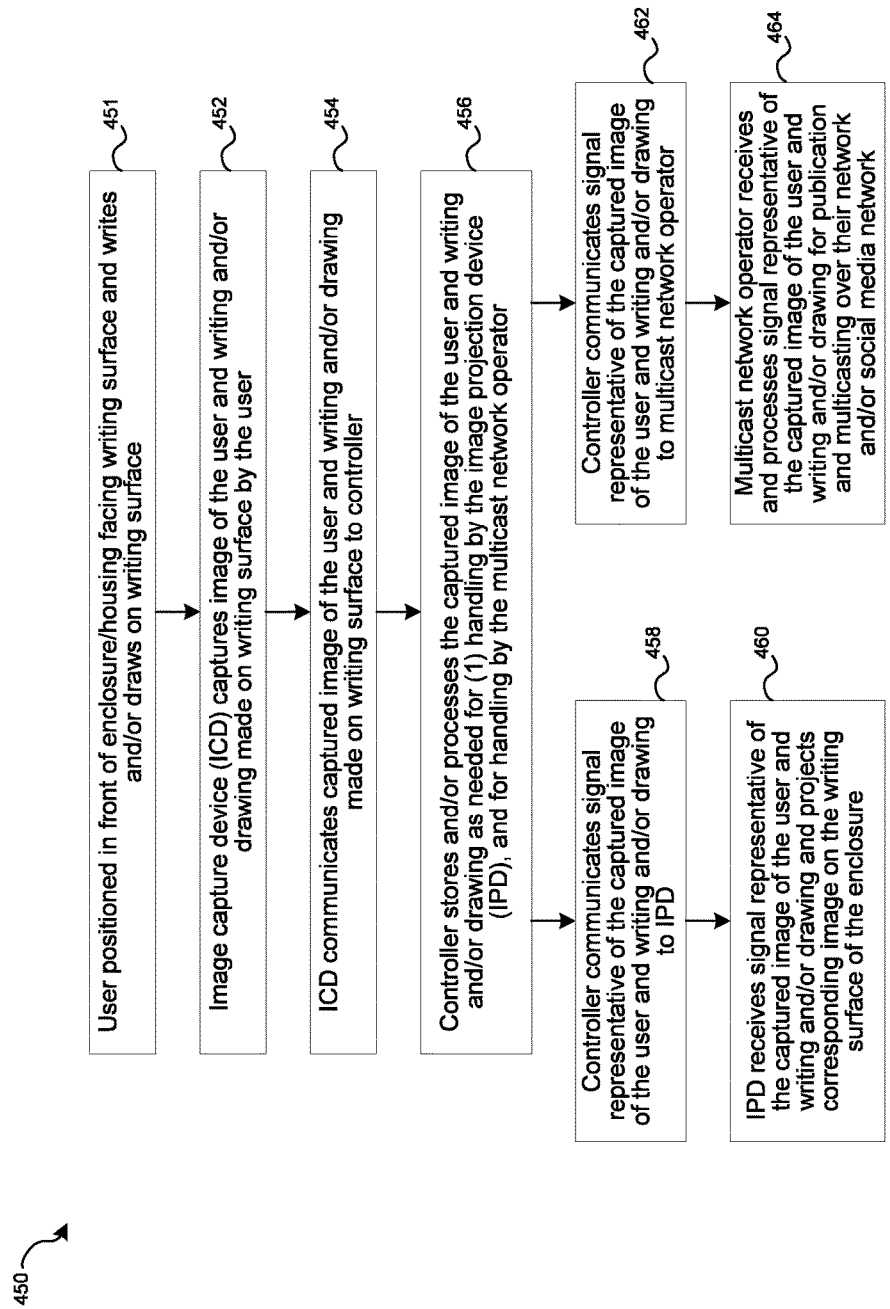
FIG. 4B is a flow chart illustrating exemplary steps for operation of the system for production and capture of content for linear broadcast and publication, as illustrated in FIG. 4A, in accordance with an exemplary embodiment of the disclosure.

Exemplary operations for capturing and displaying of the users' image and the drawn and/or written content by the device 450 are illustrated in FIG. 4B.

FIG. 4B is a flow chart illustrating exemplary steps for operation of the system for production and capture of content for linear broadcast and publication, as illustrated in FIG. 4A, in accordance with an exemplary embodiment of the disclosure. Referring to FIG. 4B, there is shown exemplary flowchart 450 comprising steps 451 through 464. While, for purposes of simplicity of explanation, the method that is illustrated by the flow chart of FIG. 3B is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In step 451, the user is positioned in front of enclosure or housing 401 facing writing surface and writes and/or draws on writing surface 402. In step 452, the ICD 404 captures image of the user and writing and/or drawing made on writing surface 402 by the user. In step 454, the ICD communicates the captured image of the user and writing and/or drawing made on writing surface 402 to controller 408. In step 456, the controller 408 stores and/or processes the captured image of the user and writing and/or drawing as needed for (1) handling by the IPD 406, and for handling by the multicast network operator 508 (FIG. 5).

In step 458, the controller 408 communicates the signal representative of the captured image of the user and writing and/or drawing to the IPD 406. In step 460, the IPD 406 receives the signal representative of the captured image of the user and writing and/or drawing and projects corresponding image on the writing surface of the enclosure.

In step 462, the controller 408 communicates the signal representative of the captured image of the user and writing and/or drawing to the multicast network operator 508 (FIG. 5). In step 464, the Multicast network operator 508 (FIG. 5) receives and processes signal representative of the captured image of the user and writing and/or drawing for publication and multicasting over their network and/or social media network 516 (FIG. 5).

FIG. 5 is a block diagram illustrating a system for publishing captured content, in accordance with an exemplary embodiment of the disclosure. Referring to FIG. 5, there is shown a system 500, a device 501, a remote operator station 504, the Internet 506, a multicast network operator 508, a content delivery network 510, a satellite network 512, a cable network 514, a social media network 516, and a plurality of user devices UD1, . . . , UDn.

The device 501 may be an image generation device and may be substantially similar to the device 100, 200, 300, and 400. In this regard, the device 501 may be one of the devices 100, 200, 300, or 400, which are illustrated in FIGS. 1A, 2A, 3A, and 4A. For ease of description, only the controller 502A is shown in device 501.

The controller 502A may comprise a computer readable medium 502B, a memory 502C, a processor 502D, a transmitter and receiver (transceiver) 502E, an image and/or graphics processor 502F, a user interface processor 502G, an audio processor 502H, an operations and maintenance controller 502I, and a bus 502.

The controller 502A may be implemented with a bus architecture, represented generally by the bus 503. The bus 503 may include any number of interconnecting buses and bridges depending on the specific architecture of the controller 502A and the overall design constraints. The bus 503 links together various circuits and/or components including the computer readable medium 502B, the memory 502C, the processor 502D, the transmitter and receiver (transceiver) 502E, the image and/or graphics processor 502F, the user interface processor 502G, the audio processor 502H, and the operations and maintenance controller 502I. The bus 503 may also link various other circuits such as timing sources, peripherals, voltage regulators, and power management circuits, which are well known in the art, and therefore, will not be described any further.

The computer-readable medium 502B may be utilized for storing data or information that may be manipulated by the processor 502D when executing software or to code. One or more functions performed by the device 500 may be implemented by the processor 502D, the computer-readable medium 502B, the memory 502C, or a combination thereof. For example, the computer-readable medium 502B may store instructions executable by the processor 502D for providing the generation of content utilizing the device 500 and providing that generated content to a multicast network operator for distribution via their network and one or more other networks such as social media networks. Some functions performed by the device 500 may also be implemented in firmware.

The processor 502D may be operable to manage the bus 302 and general processing of data, including the execution of software or code stored on the computer-readable medium 502B. The software or code, when executed by the processor 502D, causes the device 500 to perform the various functions described infra for any particular device or component. Although not shown, a bus interface may be utilized to handle and/or arbitrate access to the bus 503.

The transmitter and receiver 502E may enable communication with various other apparatus over a transmission medium. For example, the transmitter and receiver 502E may enable communication between the remote operator station 504 and the operations and maintenance controller 502I. The transmitter and receiver 502E may enable communication between the device 500 and the multicast network operator 508 via the Internet 506.

The user interface processor 502G may comprise suitable, logic, circuitry, interfaces and/or code, which may be executed by the processor 502D, which may control operations which enables the user interface with the device 501. For example, the user interface processor 502G may be operable to control operations of one or more of the writing capture devices, the image projection devices, the image capture devices, the keyboard, the one or more sensors, the one or more microphones and the one or more speakers, which are shown in and described with respect to one or more of the FIGS. 1A, 2A, 3A, and 4A.

The image and/or graphics processor 502E may be operable to handle the processing of image and/or graphics generated by the writing capture devices, the image capture devices, the image projection devices, including the execution of software stored on the computer-readable medium 502B. Image and/or graphics processing software or code, which may be stored in the memory 502C, when executed by the image and/or graphics processor 502E, may cause the device 500 to perform the various functions described infra, which are related to the processing of images and/or graphics. For example, the image and/or graphics processor 502E may be operable to handle cropping of the image of the user that may be captured by the ICD. The image and/or graphics processor 502E may also be operable to generate visual cues for the use that may be projected by the IPD and the monitor.

The audio processor 502H may be operable to handle the processing of audio received from one or more microphones, and the one or more speakers, including the execution of software stored on the computer-readable medium 502B. Audio processing software, which may be stored in the memory 502C, when executed by the image and/or graphics processor 502E, may cause the device 500 to perform the various functions described infra, which are related to the processing of audio. The audio processor 502H may be operable to generate audio prompts that enable the user to produce and publish content utilizing the device 100, 200, 300, 400, and/or 501.

The operations and maintenance controller 502I may be operable to handle communication between the device 501 and the remote operator station 504, which may enable the remote operator station 504 to remotely control the device 501. In this regard, the operations and maintenance controller 502I may enable the remote operator station to remotely provision and manage the operation of the remote device 501. Operations and maintenance software, which may be stored in the memory 502C, when executed by the operations and maintenance controller 502I, may cause the device 500 to perform the various functions described infra, which are related to the processing of audio.

The remote operator station 504 may comprise suitable, logic, circuitry, devices, interfaces and/or code, which may be executed by a processor, enables various functions and/or operations of the device 500 to be controlled remotely. For example, the remote operator station 504 may be operable to remotely diagnose problems with the device 100, 200, 300, and/or 400, 501

The multicast network operator 508 may be operable to generate content, process the received content, and publish the generated and processed content. The multicast network operator 508 may comprise one or more encoders and decoders 508A, a metadata database 50B, one or more servers 508C, and a packager 508D. The one or more encoders and decoders 508A may be operable to decode and extract messages from received content. The extracted messages may be utilized for processing the received content. The one or more servers 508C may be utilized to store and serve content. The packager 508d may comprise suitable devices, processors, logic, interfaces, circuitry, and/or code that may be operable to receive content from one or more network sources such as the devices 100, 200, 300, 400, and 501 in one or more received formats and convert the received information from the one or more received formats to one or more corresponding output formats. In the regard, for example, the packager 508d may be operable to receive one or more MPEG-2 transport stream (TS) from the deviced 100, 200, 300, 400, and 501 and convert the corresponding content to one or more output formats based on, for example, a target device profile. For example, the processor 502D may be operable to convert the merged content of the captured image of the user and written and/or drawn content into and MPEG-2 transport stream or one or more hypertext transfer protocol (HTTP) formats such as HLS, protected HLS, Smooth Streams, and dynamic adaptive streaming over HTTP (Dash) for transport over the Internet to the multicast network operator 508. The encoder/decoder 508A may be operable to decode the MPEG-2 TS or HTTP formatted merged content. The packager 508D may be operable to package the resulting decoded content with other content into one or more streams based on information in the metadata database 508B. In this regard, based on information in the metadata database 508B, the packager 508D may be operable to package the resulting decoded content with other content into, (1) a first stream for distribution via the satellite network 512, (2) a second stream for distribution via the cable network 518, and/or (3) a third stream for distribution via the social media network 516. The data or information in each of the first stream, the second stream, and the third stream may be formatted appropriate for each of the satellite network 512, cable network 518, and social media network 516.

The resulting packaged content may be encoded by the packager 508D and communicated to the content delivery network 510. The content delivery network 510 may be utilized to distribute or publish the content to the satellite network 512, the cable network 514, and/or the social media network 516. For example, the CDN 510 may distribute or publish, (1) the first stream via the satellite network 512, (2) the second stream via the cable network 514, and (3) (1) the third stream via the social media network 516.

The published content may be distributed via the satellite network 512, the cable network 514, and/or the social media network 516 to one or more of the user devices UD1, . . . UDn. The satellite network 512, the cable network 514, and/or the social media network 516 may comprise one or more servers, and/or communication interface devices that may enable communication and/or distribution of content produced by the device 501 to one or more of the plurality of user devices UD1, . . . , UDn. In this regard, the content produced by the device 501 may be communicated to one or more of the user devices UD1, . . . , UDn in, (1) the first stream via the satellite network 512, (2) the second stream via the cable network 514, and (3) the third stream via the social media network 516.

The plurality of user devices UD1, . . . , UDn, which may also be referred to as user equipment (UE), may comprise any type of mobile device, such as, but not limited to, a smartphone, cellular telephone, mobile phone, laptop computer, tablet computer, or other portable networked device that can be a standalone device, tethered to another device (e.g., a modem connected to a computer), a watch, a personal digital assistant, a personal monitoring device, a machine monitoring device, a machine to machine communication device, etc. In addition, a UE may also be referred to by those skilled in the art as a mobile station, a subscriber station, a mobile unit, a subscriber unit, a wireless unit, a remote unit, a mobile device, a mobile communications device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In general, a UE may be small and light enough to be considered portable and may be configured to communicate wirelessly via an over-the-air communication link using one or more OTA communication protocols described herein. Additionally, in some examples, a UE may be configured to facilitate communication on multiple separate networks via multiple separate subscriptions, multiple communication links such as radio links, and/or the like.

Figure 6:
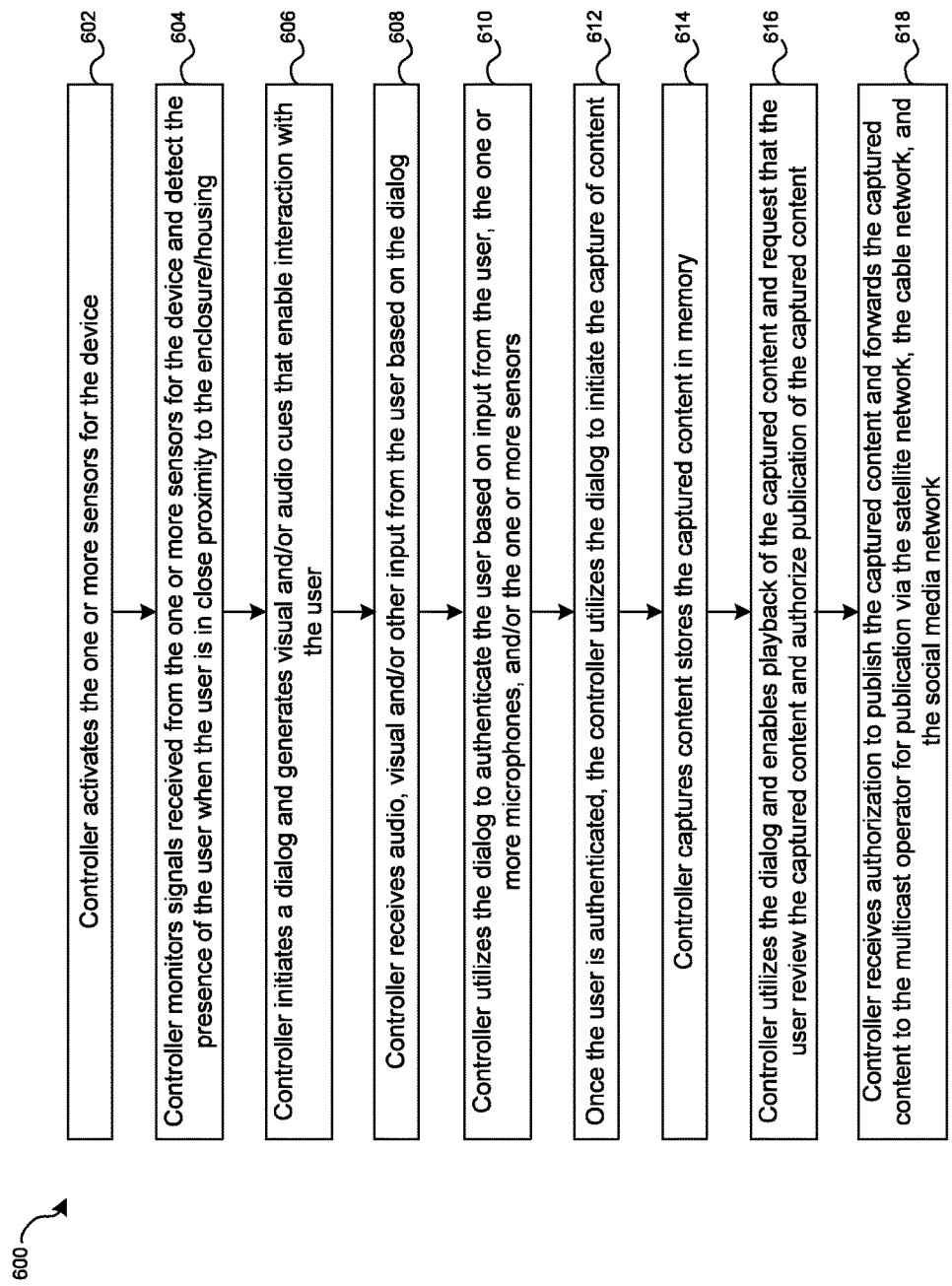
FIG. 6 is a flow chart illustrating exemplary steps for interacting with a user for production and capture of content for publication by a multicast network operator, in accordance with an exemplary embodiment of the disclosure.

FIG. 6 is a flow chart illustrating exemplary steps for interacting with a user for production and capture of content for publication by a multicast network operator, in accordance with an exemplary embodiment of the disclosure. Referring to FIG. 6, there is shown a plurality of exemplary steps 602 through 618.

In step 602, the controller 502A activates the one or more sensors (118, 218, 318, 418) for the device 500. In step 604, the controller 502A monitors signals received from the one or more sensors (118, 218, 318, 418) for the device and detect the presence of the user when the user is in close proximity to the enclosure or housing (501). In step 606, the controller 502A initiates a dialog and generates visual and/or audio cues that enable interaction with the user. In step 608, the controller 502A receives audio, visual and/or other input from the user based on the dialog. In step 610, the controller 502A utilizes the dialog to authenticate the user based on input from the user, the one or more microphones (120, 220, 320, 420), and/or the one or more sensors (118, 218, 318, 418). In step 612, once the user is authenticated, the controller 520A utilizes the dialog to initiate the capture of content. In step 614, the controller 520A captures the content and stores the captured content in the memory 502C. In step 616, the controller 502A utilizes the dialog and enables playback of the captured content and request that the user review the captured content and authorize publication of the captured content. In step 618, the controller 502A receives the authorization to publish the captured content and forwards the captured content to the multicast operator 508 for publication via content delivery network 510, and one or more of the satellite network 512, the cable network 514, the social media network 516, and the Internet 504.

Regarding step 616, as part of the review of the captured content by the user, the controller 502A, the image and/or graphics processor 502F, and/or the audio processor 502H may be operable to execute code that may be stored in the memory 502C to initiate an editing function. The user may utilize the editing function to edit the generated content then authorize the publication of the edited content by the multicast operator 508.

In accordance with various exemplary embodiments of the disclosure, a content generation device (CGD) 200 comprises an opaque WCD 202, an ICD 204, a controller 208, and a presentation device such as a monitor 206. The CGD 200 may be housed within and enclosure 201. The ICD 204 captures image content of a user performing one or both of drawing and writing on the opaque WCD 202, wherein the user is located external to the content generation device 202 and in front of the opaque WCD 202, and the capturing of the image content occurs from within the CGD 200 and behind the opaque WCD 202. The opaque WCD 202 concurrently captures the user generated content corresponding to the one or both of drawing and writing. The controller 208 synchronously merges the image content and the user generated content to generate merged content. The presentation device such as the monitor 206 is operable to present the merged content from within the CGD 200 so that the presented merged content is viewable by the user through the opaque WCD 202. The controller 208 communicates the merged content to a multicast network operator 508 for publication via one or more networks. The one or more networks comprise a cable network 514, a satellite network 512, the Internet 506, and/or a social media network 516.

The controller 208 encodes the merged content for communication to the multicast network operator 508. The presentation device such as the monitor 206 displays the merged content within the CGD 200, and the displayed merged content is viewable by the user through the opaque WCD 202. In an embodiment of the disclosure, the displayed merged content is viewable by the user through a reflective pane 210 that is located in the CGD 200 between the opaque WCD 202 and the display device such as the monitor 203, and the displayed merged content is unreflected by the reflective pane 210. The ICD 204 captures the image content through reflection of the image content by the reflective pane 210. The reflective pane 210 has a reflectance in a range of 30%-50% and a transmission in a range of 46%-66% measured at a beam-splitter side of the reflective pane 210. The reflective pane 210 has a mirror coating on one side and an antireflective coating on the other side, wherein the antireflective coated side comprises 45 degrees beamsplitters.

In another embodiment of the disclosure, and with reference to FIG. 3A, the displayed merged content is viewable by the user through a reflective pane 310 that is located in the CGD 300, and the displayed merged content is reflected by the reflective pane 310. The image content captured by the ICD 304 is unreflected by the reflective pane 310. The reflective pane 310 has a reflectance in a range of 30%-50% and a transmission in a range of 46%-66% measured at a beam-splitter side of the reflective pane 310. The reflective pane 310 has a mirror coating on one side and an antireflective coating on the other side, wherein the antireflective coated side comprises 45 degrees beamsplitters.

The controller 208 formats the merged content for display on the display device such as the monitor 206. The CGD 200 comprises one or more sensors 218 that senses the presence of the user. The controller 208 generates at least one dialog for interacting with the user. The at least one dialog generates visual cues via the monitor 206 and/or audible cues via the one or more speakers 222 for the user. The controller 208 receives visual and/or audible responses from the user based on the at least one dialog. The controller 208 authenticates the user based on the at least one dialog. The controller 208 may receive one or more signals from a remote operator station 504 that controls operation, maintenance and provisioning of the CGD 200.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention"

does not require that all embodiments of the invention include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for production and capture of content for linear broadcast and publication.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present invention has been described with reference to certain embodiments, it will be noted understood by, for example, those skilled in the art that various changes and modification could be made and equivalents may be substituted without departing from the scope of the present invention as defined, for example, in the appended claims. In addition, many modifications may be made to adapt a particular situation or material to the teachings of the present invention without departing from its scope. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated. Therefore, it is intended that the present invention not be limited to the particular embodiment disclosed, but that the present invention will include all embodiments falling within the scope of the appended claims.

What is claimed is:
1. A method, comprising:
    in a content generation device comprising a writing capture device, at least one sensor, and an image capture device:
        detecting a presence of a user, at a first position, based on a plurality of signals received from the at least one sensor;

generating a first dialog to prompt the user to move from the first position to a second position that is different from the first position,
  wherein the second position is in front of the writing capture device;
generating a second dialog to interact with the user, wherein the second dialog comprises at least one of visual cues or audible cues for the user;
receiving at least one of visual responses or audible responses from the user based on the second dialog;
authenticating the user based on the at least one of the visual responses or the audible responses;
capturing by the image capture device, first image content of the user through a partially opaque screen of the writing capture device, wherein the first image content is captured based on the authentication, wherein the user is located external to the content generation device, and
  wherein the first image content is captured from within the content generation device and behind the writing capture device;
wherein the first image content captured by the image capture device is unreflected by the reflective pane;
concurrently capturing by the writing capture device, user generated content corresponding to at least one of second image content drawn by the user or third image content written by the user;
synchronously merging by the content generation device, the first image content and the user generated content to generate merged content; and
presenting the merged content on the partially opaque screen of the writing capture device, wherein the merged content is presented based on one of a reflection of a display of the merged content on a display device to the partially opaque screen or a projection of the merged content on the partially opaque screen,
  wherein the merged content is viewable through a reflective pane that is located in the content generation device between the writing capture device and the display device,
  wherein the reflective pane has a mirror coating on a first side facing the display device and an antireflective coating on a second side which is opposite to the first side, and
  wherein the second side comprises 45 degrees beam splitters; and
communicating the merged content to a multicast network operator for publication via at least one network.

2. The method according to claim 1, wherein the at least one network comprises a cable network, a satellite network, or Internet.

3. The method according to claim 1, wherein the at least one network comprises a social media network.

4. The method according to claim 1, further comprising encoding the merged content for communication to the multicast network operator.

5. The method according to claim 1, wherein
the presenting comprises displaying the merged content on the display device within the content generation device, and
the displayed merged content is viewable through the partially opaque screen of the writing capture device.

6. The method according to claim 5, wherein the image capture device is configured to capture the first image content through a reflection of the first image content by the reflective pane.

7. The method according to claim 5, wherein the reflective pane has a reflectance in a range of 30%-50% and a transmission in a range of 46%-66% measured at a beam-splitter side of the reflective pane.

8. The method according to claim 5,
wherein the displayed merged content is viewable on the partially opaque screen through the reflective pane in the content generation device, and
wherein the displayed merged content is reflected by the reflective pane.

9. The method according to claim 8, wherein the reflective pane has a reflectance in a range of 30%-50% and a transmission in a range of 46%-66% measured at a beam-splitter side of the reflective pane.

10. The method according to claim 5, further comprising formatting the merged content for the display on the display device.

11. The method according to claim 1, further comprising receiving at least one signal from a remote operator station that controls at least one of operation, maintenance or provisioning of the content generation device.

12. The method according to claim 1, wherein the synchronously merging of the first image content and the user generated content to generate the merged content is based on timestamps associated with the first image content and the user generated content.

13. A system, comprising:
a content generation device comprising:
  a writing capture device;
  at least one sensor configured to detect a presence of a user, at a first position;
  a controller configured to:
    generate a first dialog to prompt the user to move from the first position to a second position that is different from the first position,
    wherein the second position is in front of the writing capture device;
    generate a second dialog to interact with the user, wherein the second dialog comprises at least one of visual cues or audible cues for the user;
    receive at least one of visual responses or audible responses from the user based on the second dialog;
    authenticate the user based on the at least one of the visual responses or the audible responses;
  an image capture device configured to capture first image content of the user through a partially opaque screen of the writing capture device, wherein the first image content is captured based on the authentication, wherein the user is located external to the content generation device;
  wherein the first image content is captured from within the content generation device and behind the writing capture device;
  wherein the first image content captured by the image capture device is unreflected by the reflective pane;
  wherein the writing capture device is further configured to concurrently capture user generated content that corresponds to at least one of second image content drawn by the user or third image content written by the user; and wherein the controller further configured to synchronously merge the first image content and the user generated content to generate merged content; and
a presentation device configured to present the merged content on the partially opaque screen of the writing capture device,
wherein the merged content is presented based on one of a reflection of a display of the merged content on a display device to the partially opaque screen or a projection of the merged content on the partially opaque screen,
wherein the merged content is viewable through a reflective pane that is located in the content generation device between the writing capture device and the display device,
wherein the reflective pane has a mirror coating on a first side facing the display device and an antireflective coating on a second side which is opposite to the first side,
wherein the second side comprises 45 degrees beam splitters, and
wherein the controller is further configured to communicate the merged content to a multicast network operator for publication via at least one network.

14. The system according to claim 13, wherein the at least one network comprises a cable network, a satellite network, or Internet.

15. The system according to claim 13, wherein the at least one network comprises a social media network.

16. The system according to claim 13, wherein the controller is further configured to encode the merged content for communication to the multicast network operator.

17. The system according to claim 13, wherein the presentation device is further configured to display the merged content on the display device within the content generation device, and the displayed merged content is viewable through the partially opaque screen of the writing capture device.

18. The system according to claim 17, wherein the image capture device is further configured to capture the first image content through a reflection of the first image content by the reflective pane.

19. The system according to claim 17, wherein the reflective pane has a reflectance in a range of 30%-50% and a transmission in a range of 46%-66% measured at a beam-splitter side of the reflective pane.

20. The system according to claim 17, wherein the displayed merged content is viewable through the reflective pane in the content generation device, and the displayed merged content is reflected by the reflective pane.

21. The system according to claim 20, wherein the reflective pane has a reflectance in a range of 30%-50% and a transmission in a range of 46%-66% measured at a beam-splitter side of the reflective pane.

22. The system according to claim 17, wherein the controller is further configured to format the merged content for the display on the display device.

23. The system according to claim 13, wherein the controller is further configured to receive at least one signal from a remote operator station that controls at least one of operation, maintenance or provisioning of the content generation device.

24. The system according to claim 13, wherein the controller is further configured to synchronously merge the first image content and the user generated content to generate the merged content based on timestamps associated with the first image content and the user generated content.

25. A method, comprising:
in a controller:
receiving signals from at least one sensor present within a content generation device;
monitoring the received signals;
detecting a presence of a user, at a first position, based on the monitored signals;
generating a first dialog to prompt the user to move from the first position to a second position that is different from the first position, wherein the second position is in front of a writing capture device;
generating a second dialog for interacting with the user on the writing capture device, wherein the second dialog comprises at least one of visual cues or audible cues for the user;
receiving at least one of visual responses or audible responses from the user based on the second dialog;
authenticating the user based on the at least one of the visual responses or the audible responses;
capturing content associated with the user, through a partially opaque screen of the writing capture device, based on the authentication;
controlling display of the captured content on the partially opaque screen, wherein the captured content is displayed based on one of a reflection of the display of the captured content on a display device to the partially opaque screen or a projection of the captured content on the partially opaque screen,
wherein the captured content is viewable through a reflective pane that is located in the content generation device between the writing capture device and the display device,
wherein the reflective pane has a mirror coating on a first side facing the display device and an antireflective coating on a second side which is opposite to the first side, and wherein the second side comprises 45 degrees beam splitters;
wherein the captured content is unreflected by the reflective pane; and
communicating the captured content to a multicast network operator for publication via at least one network.

26. The method according to claim 25, wherein the at least one network comprises a cable network, a satellite network, or Internet.

27. The method according to claim 25, wherein the at least one network comprises a social media network.

28. The method according to claim 25, wherein the captured content associated with the user comprises first image content of the user and user generated content corresponding to at least one of second image content drawn by the user or third image content written by the user.

29. The method according to claim 28, wherein the user is located in front of the partially opaque screen of the writing capture device.

30. An apparatus, comprising:
one or more processors configured to:
receive signals from at least one sensor present within a content generation device;
monitor the received signals;
detect a presence of a user, at a first position, based on the monitored signals;
generate a first dialog to prompt the user to move from the first position to a second position that is different from the first position, wherein the second position is in front of a writing capture device;

generate a second dialog to interact with the user on the writing capture device, wherein the second dialog generates at least one of visual cues or audible cues for the user;

receive at least one of visual responses or audible responses from the user based on the second dialog;

authenticate the user based on the at least one of the visual responses or the audible responses;

capture content associated with the user, through a partially opaque screen of the writing capture device, based on the authentication;

control display of the captured content on the partially opaque screen, wherein the captured content is displayed based on one of a reflection of a display of the captured content on a display device to the partially opaque screen or a projection of the captured content on the partially opaque screen, wherein the captured content is viewable through a reflective pane that is located in the content generation device between the writing capture device and the display device, wherein the reflective pane has a mirror coating on a first side facing the display device and an antireflective coating on a second side which is opposite to the first side, and wherein the second side comprises 45 degrees beam splitters, and wherein the captured content is unreflected by the reflective pane; and communicate the captured content to a multicast network operator for publication via at least one network.

31. The apparatus according to claim 30, wherein the at least one network comprises a cable network, a satellite network, or Internet.

32. The apparatus according to claim 30, wherein the at least one network comprises a social media network.

33. The apparatus according to claim 30, wherein the captured content associated with the user comprises first image content of the user and user generated content corresponding to at least one of second image content drawn by the user or third image content written by the user.

34. The apparatus according to claim 33, wherein the partially opaque screen of the writing capture device includes opaque material.

35. A non-transitory computer-readable medium having stored thereon, computer-executable instructions, which when executed by a processor, cause a computer to execute operations, the operations comprising:

receiving signals from at least one sensor present within a content generation device;

monitoring the received signals;

detecting a presence of a user, at a first position, based on the received signals;

generating a first dialog to prompt the user to move from the first position to a second position that is different from the first position, wherein the second position is in front of a writing capture device;

generating a second dialog for interacting with the user on the writing capture device, wherein the second dialog generates at least one of visual cues or audible cues for the user;

receiving at least one of visual responses or audible responses from the user based on the second dialog;

authenticating the user based on the at least one of the visual responses or the audible responses;

capturing content associated with the user through a partially opaque screen of the writing capture device, based on the authentication;

controlling display of the captured content on the partially opaque screen, wherein the captured content is displayed based on one of a reflection of the display of the captured content on a display device to the partially opaque screen or a projection of the captured content on the partially opaque screen, wherein the captured content is viewable through a reflective pane that is located in the content generation device between the writing capture device and the display device, wherein the captured content is unreflected by the reflective pane, and wherein the reflective pane has a mirror coating on a first side facing the display device and an antireflective coating on a second side which is opposite to the first side, and wherein the second side comprises 45 degrees beam splitters; and communicating the captured content to a multicast network operator for publication via at least one network.

36. The non-transitory computer-readable medium according to claim 35, wherein the at least one network comprises a cable network, a satellite network, or Internet.

37. The non-transitory computer-readable medium according to claim 35, wherein the at least one network comprises a social media network.

38. The non-transitory computer-readable medium according to claim 35, wherein the captured content associated with the user comprises first image content of the user and user generated content corresponding to at least one of second image content drawn by the user or third image content written by the user.

39. The non-transitory computer-readable medium according to claim 38, wherein the user is located in front of the partially opaque screen of the writing capture device.

* * * * *